(12) United States Patent
Burns et al.

(10) Patent No.: US 10,514,521 B2
(45) Date of Patent: Dec. 24, 2019

(54) OPTICAL FIBER ASSEMBLIES, AND METHODS AND APPARATUS FOR THE MANUFACTURE THEREOF

(71) Applicant: Corning Optical Communications LLC, Hickory, NC (US)

(72) Inventors: Rodney Maurice Burns, Conover, NC (US); Andrey V. Filippov, Houston, TX (US); Riley Saunders Freeland, Painted Post, NY (US); Daniel Warren Hawtof, Corning, NY (US); Warren Welborn McAlpine, Hickory, NC (US); Catharina Lemckert Tedder, Catawba, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 625 days.

(21) Appl. No.: 15/210,155

(22) Filed: Jul. 14, 2016

(65) Prior Publication Data
US 2016/0320581 A1   Nov. 3, 2016

Related U.S. Application Data

(63) Continuation of application No. 13/020,174, filed on Feb. 3, 2011, now Pat. No. 9,417,421, which is a
(Continued)

(51) Int. Cl.
*G02B 6/44* (2006.01)
*B29C 48/05* (2019.01)
(Continued)

(52) U.S. Cl.
CPC ............ *G02B 6/4486* (2013.01); *B29C 48/05* (2019.02); *B29C 48/09* (2019.02); *B29C 48/156* (2019.02);
(Continued)

(58) Field of Classification Search
CPC ................ G02B 6/4494; G02B 6/4486; B29D 11/00663; B29C 47/0014; B29C 47/28; B29C 47/027; B29C 47/0023
(Continued)

(56) References Cited

U.S. PATENT DOCUMENTS 3,538,235 A    11/1970   Arendt et al.
4,002,819 A    1/1977    Woytiuk
(Continued)

FOREIGN PATENT DOCUMENTS

DE    4134370 C1    1/1993
DE    4219607 A1 *  12/1993   ........... G02B 6/4494
(Continued)

OTHER PUBLICATIONS

DE '607 translation (Year: 1993).*
(Continued)

*Primary Examiner* — Michael P Wieczorek
*Assistant Examiner* — Michael G Miller
(74) *Attorney, Agent, or Firm* — William D. Doyle

(57) ABSTRACT

Methods for manufacturing cables and cables assemblies include providing powder particles within a tube extruded about optical fiber. The particles may be accelerated so that as they strike the tube and mechanically attach to the tube.

11 Claims, 18 Drawing Sheets

Related U.S. Application Data continuation of application No. PCT/US2009/004684, filed on Aug. 14, 2009.

(60) Provisional application No. 61/189,076, filed on Aug. 15, 2008.

(51) Int. Cl.
| | |
|---|---|
| *B29C 48/09* | (2019.01) |
| *B29C 48/30* | (2019.01) |
| *B29C 48/34* | (2019.01) |
| *B29C 48/156* | (2019.01) |
| *B29D 11/00* | (2006.01) |
| *B29K 23/00* | (2006.01) |
| *B29L 11/00* | (2006.01) |

(52) U.S. Cl.
CPC .............. *B29C 48/30* (2019.02); *B29C 48/34* (2019.02); *B29D 11/00663* (2013.01); *G02B 6/4433* (2013.01); *G02B 6/4434* (2013.01); *G02B 6/4436* (2013.01); *G02B 6/4494* (2013.01); *B29K 2023/12* (2013.01); *B29L 2011/0075* (2013.01)

(58) Field of Classification Search
USPC .......................... 427/248.1–255.7, 160–169
See application file for complete search history.

(56) References Cited

U.S. PATENT DOCUMENTS

| | | | |
|---|---|---|---|
| 4,004,077 A | 1/1977 | Woytiuk | |
| 4,291,640 A * | 9/1981 | Payne | B05B 5/12 118/50.1 |
| 4,419,157 A | 12/1983 | Ferrentino | |
| 4,441,787 A | 4/1984 | Lichtenberger | |
| 4,474,638 A | 10/1984 | Einsle | |
| 4,535,098 A | 8/1985 | Evani et al. | |
| 4,596,443 A | 6/1986 | Diemeer et al. | |
| 4,909,592 A | 3/1990 | Arroyo et al. | |
| 4,987,001 A * | 1/1991 | Knobbe | B05B 5/12 427/478 |
| 5,010,209 A | 4/1991 | Marciano et al. | |
| 5,037,247 A | 8/1991 | Kaiser et al. | |
| 5,049,593 A | 9/1991 | Marciano et al. | |
| 5,051,259 A | 9/1991 | Olsen et al. | |
| 5,075,373 A | 12/1991 | Takemori et al. | |
| 5,179,611 A | 1/1993 | Umeda et al. | |
| 5,261,021 A | 11/1993 | Pasta et al. | |
| 5,294,217 A | 3/1994 | Talacko et al. | |
| 5,296,650 A | 3/1994 | Kobayashi et al. | |
| 5,312,499 A | 5/1994 | Bolick et al. | |
| 5,321,788 A | 6/1994 | Arroyo et al. | |
| 5,335,302 A | 8/1994 | Polle | |
| 5,388,175 A * | 2/1995 | Clarke | G02B 6/4401 385/100 |
| 5,410,629 A | 4/1995 | Arroyo | |
| 5,419,956 A | 5/1995 | Roe | |
| 5,532,788 A | 7/1996 | Monroe | |
| 5,684,904 A * | 11/1997 | Bringuier | G02B 6/441 385/106 |
| 5,689,601 A | 11/1997 | Hager et al. | |
| 5,698,615 A | 12/1997 | Polle | |
| 5,740,295 A | 4/1998 | Kinard et al. | |
| 5,751,880 A | 5/1998 | Gaillard | |
| 5,971,207 A | 10/1999 | McDonough et al. | |
| 6,178,278 B1 | 1/2001 | Keller et al. | |
| 6,195,486 B1 | 2/2001 | Field et al. | |
| 6,253,012 B1 | 6/2001 | Keller et al. | |
| 6,304,701 B1 | 10/2001 | Bringuier et al. | |
| 6,466,720 B1 | 10/2002 | Fishlock et al. | |
| 6,493,491 B1 | 12/2002 | Shen et al. | |
| 6,500,541 B1 | 12/2002 | Schoeck, Jr. et al. | |
| 6,501,888 B2 | 12/2002 | Gimblet et al. | |
| 6,504,979 B1 | 1/2003 | Norris et al. | |
| 6,542,674 B1 | 4/2003 | Gimblet et al. | |
| 6,567,592 B1 | 5/2003 | Gimblet et al. | |
| 6,577,796 B2 | 6/2003 | Anelli et al. | |
| 6,631,229 B1 | 10/2003 | Norris et al. | |
| 6,714,710 B2 | 3/2004 | Gimblet | |
| 6,909,821 B2 | 6/2005 | Ravasio et al. | |
| 6,928,217 B2 | 8/2005 | Mohler et al. | |
| 6,931,184 B2 | 8/2005 | Tedder et al. | |
| 7,009,010 B2 | 3/2006 | Kanto et al. | |
| 7,079,734 B2 | 7/2006 | Seddon et al. | |
| 7,098,284 B2 | 8/2006 | Torii et al. | |
| 7,193,006 B2 | 3/2007 | Ishizaki et al. | |
| 7,238,743 B2 | 7/2007 | Matsumoto et al. | |
| 7,277,615 B2 | 10/2007 | Greenwood et al. | |
| 7,285,615 B2 | 10/2007 | Adachi et al. | |
| 7,291,674 B2 | 11/2007 | Kang et al. | |
| 7,415,181 B2 | 8/2008 | Greenwood et al. | |
| 7,429,009 B2 | 9/2008 | Nagasawa et al. | |
| 7,471,862 B2 | 12/2008 | Bringuier et al. | |
| 7,539,380 B1 | 5/2009 | Abernathy et al. | |
| 7,693,375 B2 | 4/2010 | Bringuier et al. | |
| 7,787,727 B2 | 8/2010 | Bringuier et al. | |
| 7,916,989 B2 | 3/2011 | Bringuier et al. | |
| 2002/0159726 A1 | 10/2002 | Brown et al. | |
| 2003/0168772 A1 | 9/2003 | Palaniappan et al. | |
| 2003/0180017 A1 | 9/2003 | Hayano et al. | |
| 2003/0206705 A1 | 11/2003 | McAlpine et al. | |
| 2004/0177915 A1 | 9/2004 | Engel | |
| 2006/0198585 A1 | 9/2006 | Keller et al. | |
| 2006/0280413 A1 | 12/2006 | Paschal et al. | |
| 2007/0263965 A1 | 11/2007 | Cody et al. | |
| 2007/0269171 A1 | 11/2007 | Keller et al. | |
| 2008/0031580 A1 | 2/2008 | Keller et al. | |
| 2008/0175541 A1 | 7/2008 | Lu et al. | |
| 2008/0175542 A1 | 7/2008 | Lu et al. | |
| 2008/0175546 A1 | 7/2008 | Lu et al. | |
| 2009/0003780 A1 | 1/2009 | Bringuier et al. | |
| 2009/0129734 A1 | 5/2009 | Keller et al. | |
| 2009/0190890 A1 | 7/2009 | Freeland et al. | |
| 2010/0080521 A1 | 4/2010 | Bardroff et al. | |

FOREIGN PATENT DOCUMENTS

| | | | |
|---|---|---|---|
| DE | 4219607 A1 | 12/1993 | |
| EP | 0096123 A1 | 12/1983 | |
| EP | 0087757 B1 | 5/1986 | |
| EP | 256558 A1 * | 2/1988 | ............... G02B 6/44 |
| EP | 256558 A1 | 2/1988 | |
| EP | 0564993 A1 | 10/1993 | |
| EP | 0784220 B1 | 3/2006 | |
| JP | 50147745 A | 11/1975 | |
| JP | 8304675 A | 11/1996 | |
| JP | 10148739 A | 6/1998 | |
| JP | 2005148373 A | 6/2005 | |
| WO | 199708579 A1 | 3/1997 | |
| WO | 2000021098 A1 | 4/2000 | |
| WO | 200242822 A1 | 5/2002 | |
| WO | 2006105034 A1 | 10/2006 | |
| WO | 2008027202 A2 | 3/2008 | |
| WO | WO-2008084095 A2 * | 7/2008 | ............ B05B 5/032 |
| WO | 2009002448 A1 | 12/2008 | |

OTHER PUBLICATIONS

Sohn ("Theoretical and Experimental Investigation of the Swelling Behavior of Sodium Polyacrylate Superabsorbent Particles", Sohn et al, Journal of Applied Polymer Science, vol. 87, pp. 252-257 (2003)) (Year: 2003).*

Matsusaka ("Control of electrostatic charge on particles by impact charging", Matsusaka et al, Advanced Powder Technol. vol. 18 No. 2 pp. 229-244, 2007, accessed online Nov. 30, 2018) (Year: 2007).*

European Office Action EP08768664.8 dated Apr. 7, 2016, European Patent Office.

AU2009282453 Patent Examination Report No. 1 dated Mar. 7, 2014.

CA2732974 Office Action dated Oct. 14, 2015.

(56) References Cited

OTHER PUBLICATIONS

CN200980141115.X Office Action dated Dec. 5, 2012.
CN200980141115.X Office Action dated Oct. 29, 2013.
Degussa., Creavis Technologies & Innovation, Cabloc® GR 211 Technical Data Sheet, Apr. 2002, 3 pages.
Dhodapkar et al; 2006. "Fluid Solid Transport in Ducts" In Multiphase Flow Handbook, edited by C.T. Crowe, 4-1 through 4-48. Boca Raton: CRC Press.
EP11157672.4-2216 Search Report dated Sep. 20, 2011.
EP1157672.4-2216 Search Report dated Dec. 23, 2011.
EP13170900 Search Report dated Jul. 18, 2013.
Fujikura Ltd., Product Specification Sheet, "DC01 / Drop Cable", 2003, 1 pg.
International Search Report and Written Opinion of the International Searching Authority; PCT/US2009/004684; dated Jan. 20, 2010.
Oliver, C. E., "Picking on Icky Pick," Cabling Business Magazine, Dec. 2006, 3 pages.
Optoelectronic Industry and Technology Development Association (Japan), Technical Paper, TP-BW01-2007, "Optical Fiber Distribution System for Detached Houses in FTTH", Jul. 2007, 20 pgs.
Patent Cooperation Treaty, International Search Report for International Application No. PCT/US2009/004059, dated Oct. 30, 2009, 2 pages.
Patent Cooperation Treaty, International Search Report for International Application No. PCT/US2009/004684, dated Jan. 20, 2010, 3 pages.
Rhodes, Martin. 1998. Pneumatic Transport and Standpipes in Introduction to Particle Technology,139-159, Chichester: John Wiley & Sons.
Rosendahl Austria, Nextrom Technologies, "FOC—Dry Tube Production RL-R/OFC40 Clenching Concept, Clenching Caterpillar NCA 210," printed Apr. 17, 2008, 2 pages.
Sigma-Aldrich MSDS for Polyethylene Terephthalate, accessed online May 31, 2012 at http://www.sigmaaldrich.com/safetycenter.html.
TIA Document: "FOTP 82-B Fluid Penetration Test for Fluid-Blocked Fiber Optic Cable," TIA-455-82-B (Revision of EIA/TIA-455-82-A), Jun. 2003, 18 pages.
Wire and Cable Technology International, Jan. 2008, 51 Pages.

* cited by examiner

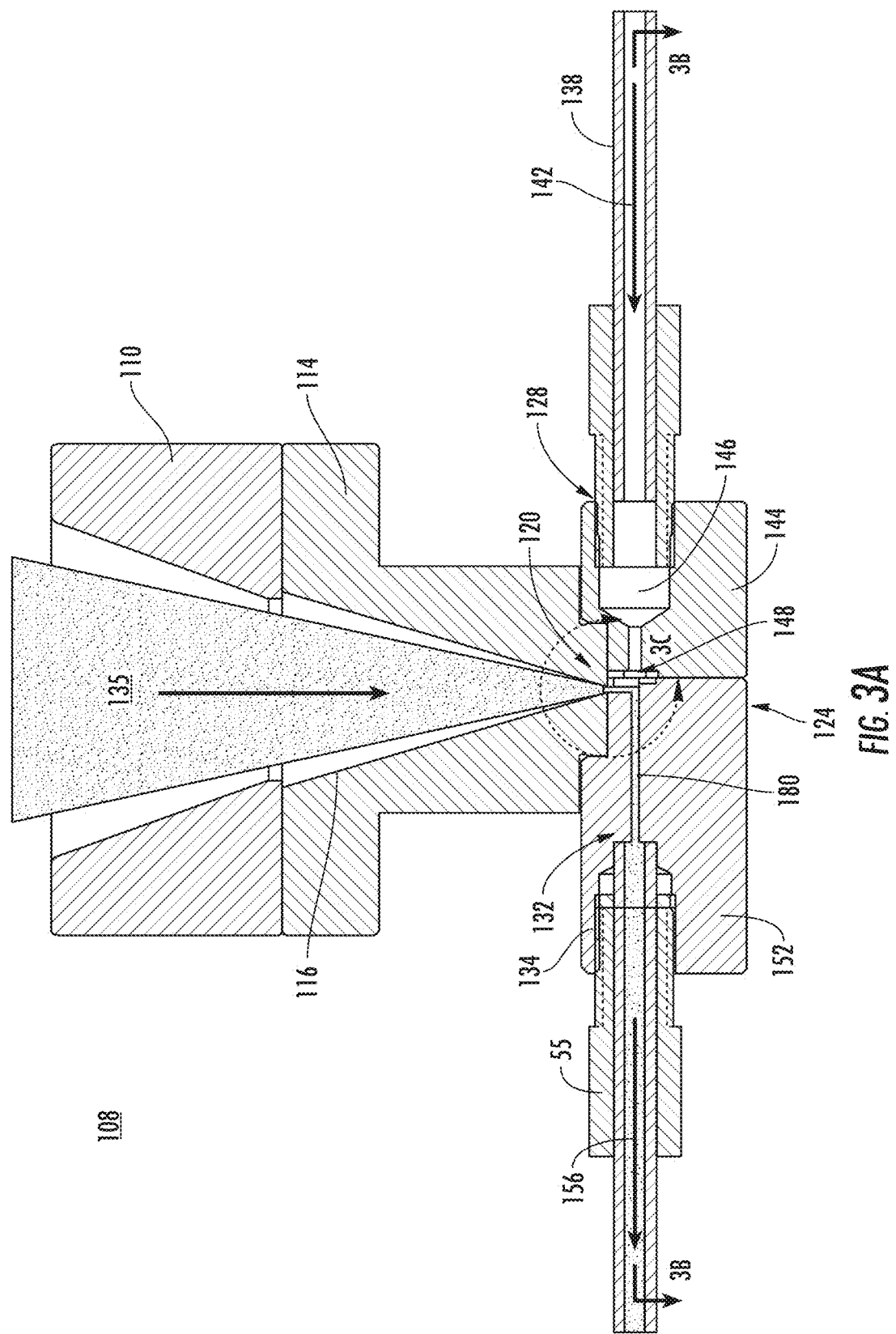

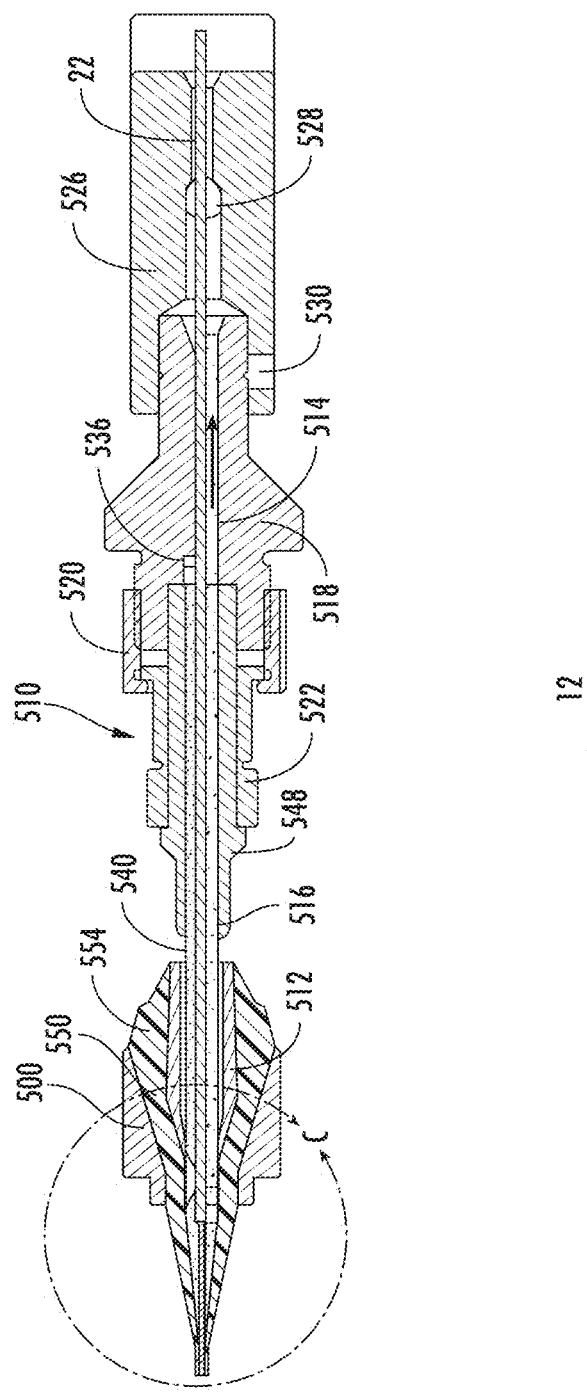

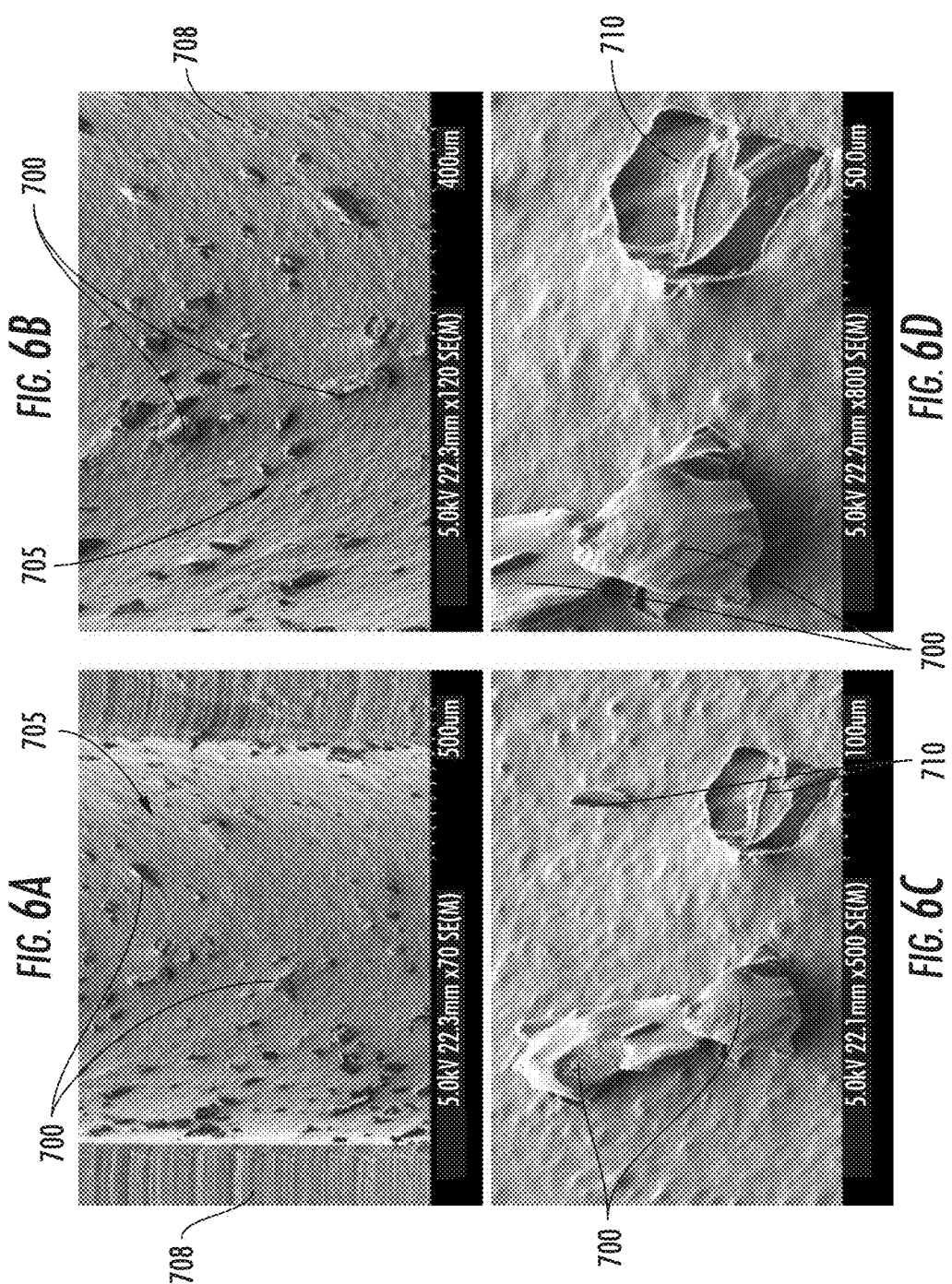

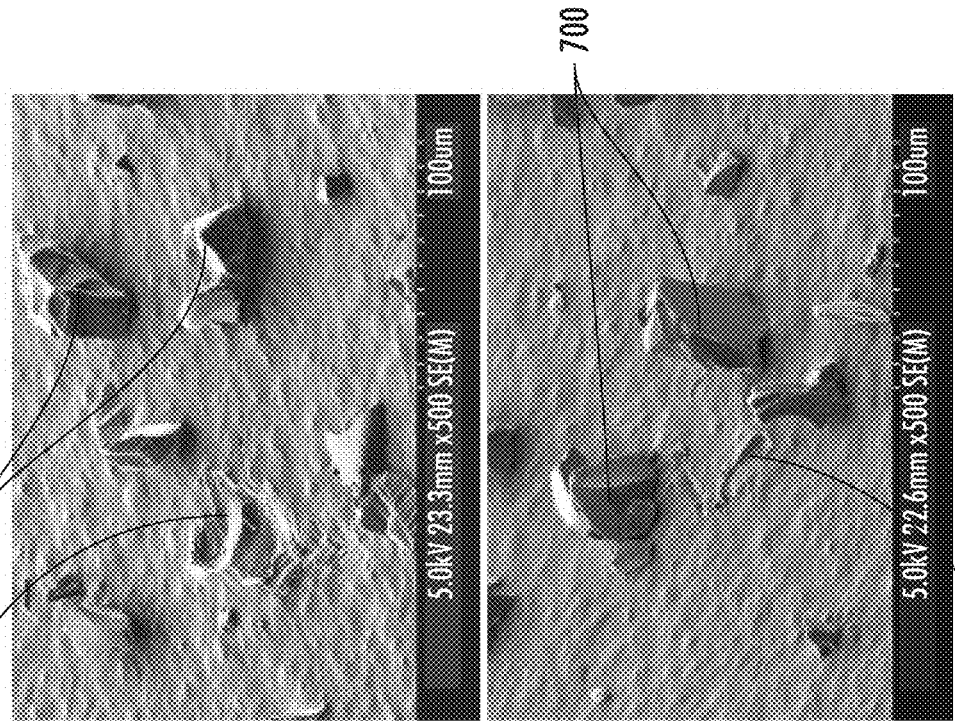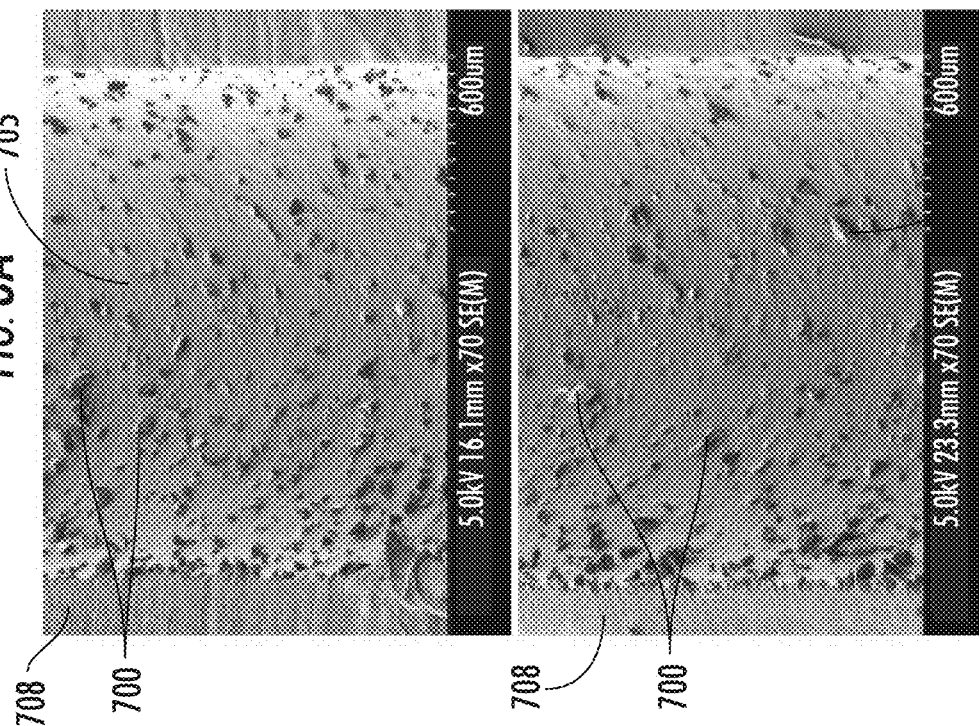
FIG. 8A  FIG. 8B  FIG. 8C  FIG. 8D

OPTICAL FIBER ASSEMBLIES, AND METHODS AND APPARATUS FOR THE MANUFACTURE THEREOF

RELATED APPLICATIONS

This application is a continuation of U.S. patent application Ser. No. 13/020,174, filed Feb. 3, 2011, which is a continuation of International Application No. PCT/US2009/004684, filed Aug. 14, 2009, which claims the benefit of U.S. Provisional Application No. 61/189,076, filed Aug. 15, 2008, the entire contents of which are incorporated herein by reference.

This application is related to U.S. application Ser. No. 12/221,118, filed Jul. 31, 2008, entitled "OPTICAL FIBER ASSEMBLIES HAVING A POWDER OR POWDER BLEND AT LEAST PARTIALLY MECHANICALLY ATTACHED," and U.S. application Ser. No. 11/821,933, filed Jun. 26, 2007, entitled "OPTICAL FIBER ASSEMBLIES HAVING RELATIVELY LOW-LEVELS OF WATER-SWELLABLE POWDER AND METHODS THEREFOR," now U.S. Pat. No. 7,630,605, and U.S. application Ser. No. 12/548,952, filed Aug. 27, 2009, the entire contents of which are hereby incorporated by reference.

TECHNICAL FIELD

The present application relates generally to methods of manufacturing optical fiber assemblies used for transmitting optical signals. More particularly, the present application relates to the manufacture of optical fiber assemblies having relatively low-levels of mechanically attached water-swellable powder and methods of providing particulate materials for manufacturing processes.

BACKGROUND

Communications networks are used to transport a variety of signals such as voice, video, data and the like. As communications applications required greater bandwidth, communication networks switched to cables having optical fibers since they are capable of transmitting an extremely large amount of bandwidth compared with copper conductors. Fiber optic cables are also much smaller and lighter compared to copper cables having the same bandwidth capacity.

In certain applications, fiber optic cables are exposed to moisture that over time may enter the fiber optic cable. The moisture can migrate along the cable and enter cable splice enclosures, buildings, etc. To block water migration, fiber optic cables were provided with one or more components for blocking the migration of water along the fiber optic cable. By way of example, conventional fiber optic cables block water migration using a filling and/or a flooding material such as gel or grease within the fiber optic cable. Filling material refers to gel or grease that is inside a tube or cavity with the optical fibers, whereas flooding material refers to gel or grease within the cable that is outside of the cavity that houses the optical fibers. The gel or grease fills voids in the cable so that water does not have a path to follow in the fiber optic cable. Additionally, the gel or grease filling material provides cushioning and coupling of the optical fibers.

Gel or grease filling materials also have disadvantages. For example, the gel or grease may be messy and may drip from an end of the fiber optic cable. The filling material must also be cleaned from the optical fibers when being prepared for an optical connection, requiring the craft to carry cleaning materials into the field. Early fiber optic cable designs eliminated the flooding material by using cleaner, dry water-blocking components such as tapes or yarns outside the buffer tubes for inhibiting water migration. These dry water-blocking components typically include super absorbent polymers (SAPs) that absorb water and swell as a result, thereby blocking the water path for inhibiting the migration of water along the fiber optic cable. Generally speaking, the water-swellable components used a yarn or tape as a carrier for the SAP. Since the water-swellable yarns and tapes were first used outside the cavity housing the optical fibers, the other functions besides water-blocking such as coupling and optical attenuation did not need to be addressed.

Eventually, fiber optic cables incorporated water-swellable yarns, tapes, or super-absorbent polymers (SAPs) within the tubes that housed the optical fibers as a replacement for gel and grease filling materials. Generally speaking, the water-swellable yarns or tapes had sufficient water-blocking capabilities, but did not provide all of the functions of the gel or grease filling materials such as cushioning and coupling. For example, water-swellable tapes and yarns are bulky since they are relatively large compared with a typical optical fiber and/or can have a relatively rough surface. As a result, water-swellable yarns or tapes may cause problems if the optical fiber is pressed against the optical fibers. Likewise, the SAPs may cause problems if pressed against the optical fibers. In some cases, optical fibers pressed against conventional water-swellable yarns, tapes, and/or SAPs may experience microbending, which can cause undesirable levels of optical attenuation and/or cause other issues. Moreover, the desired level of coupling for the optical fibers with the tube may be an issue if the fiber optic cable is not a stranded design since the stranding provides coupling.

Other early fiber optic cable designs used tube assemblies that were highly-filled with SAPs in the form of loose powder for blocking the migration of water within the fiber optic cable. However, conventionally applied loose SAP powders within the fiber optic cable created problems since the superabsorbent powder particles, which were not attached to a carrier such as a yarn or tape, could migrate to and accumulate at positions within the fiber optic cable. When the cable was wound on a reel, such SAP powders could accumulate at the low points due to gravity and/or vibration, thereby causing inconsistent water blocking within the fiber optic cable. Also, loose SAP powders are free to fall out of the end of a tube.

FIGS. 15 and 16 respectively depict a transverse cross-sectional view and a longitudinal cross-sectional view of a conventional dry fiber optic assembly 10 having a plurality of optical fibers 1 along with schematically represented loose water-swellable powder particles 3 disposed within a tube 5. The conventional dry fiber optic assembly 10 uses a relatively large quantity of SAP powder 3 within tube 5 for blocking the migration of water therein. Other conventional fiber optic cable components have included embedded SAP powder in the outer circumferential surface of a tube, such as disclosed in U.S. Pat. No. 5,388,175. However, embedding the SAP in the outer surfaces of the tube greatly reduces the effectiveness of the powder since water may not reach the embedded particles.

SUMMARY

According to one embodiment, a mixture of motive gas and particulate matter is conveyed to an extrusion process.

The mixture is conveyed to the extrusion process in a first phase, and launched or passed into an extrusion cone formed in the extrusion process in a second phase having an equivalent or higher velocity than the first phase. The particulate matter is conveyed so that at least a portion of the particulate matter becomes mechanically attached to the extrusion cone. The tube resulting from the extrusion process thereby receives an application of particulate matter to its inner or cavity surface. The first phase of conveyance can be, for example, strand phase flow, and the second phase can be dilute phase flow.

According to one embodiment, a mixture of motive gas and particulate matter is conveyed to the interior of an extrusion cone through a nozzle. The particulate matter is accelerated through the nozzle so that at least a portion of the particulate matter becomes mechanically attached to the extrusion cone.

According to another embodiment, a mixture of motive gas and particulate matter is conveyed to the interior of an extrusion cone through an annular passageway. The particulate matter is conveyed so that at least a portion of the particulate matter becomes mechanically attached to the extrusion cone.

According to one aspect of the present embodiments, the tube can be of the type used to form a fiber optic assembly, the fiber optic assembly having relatively low concentrations of particulate matter yet still retaining desired water-blocking properties.

Those skilled in the art will appreciate the above stated advantages and other advantages and benefits of various additional embodiments reading the following detailed description with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

FIG. 3A is a cross-sectional view of a portion of the powder/gas mixing section.

FIG. 5A is a section view of an apparatus performing an extrusion process and powder application process according to another embodiment of the invention.

FIGS. 6A-6D are photographs at varying magnifications illustrating mechanical attachment of SAP particles to a tube interior.

FIGS. 8A-8D is yet another set of photographs at varying magnifications illustrating mechanical attachment of SAP particles to a tube interior.

DETAILED DESCRIPTION

Figure 1:
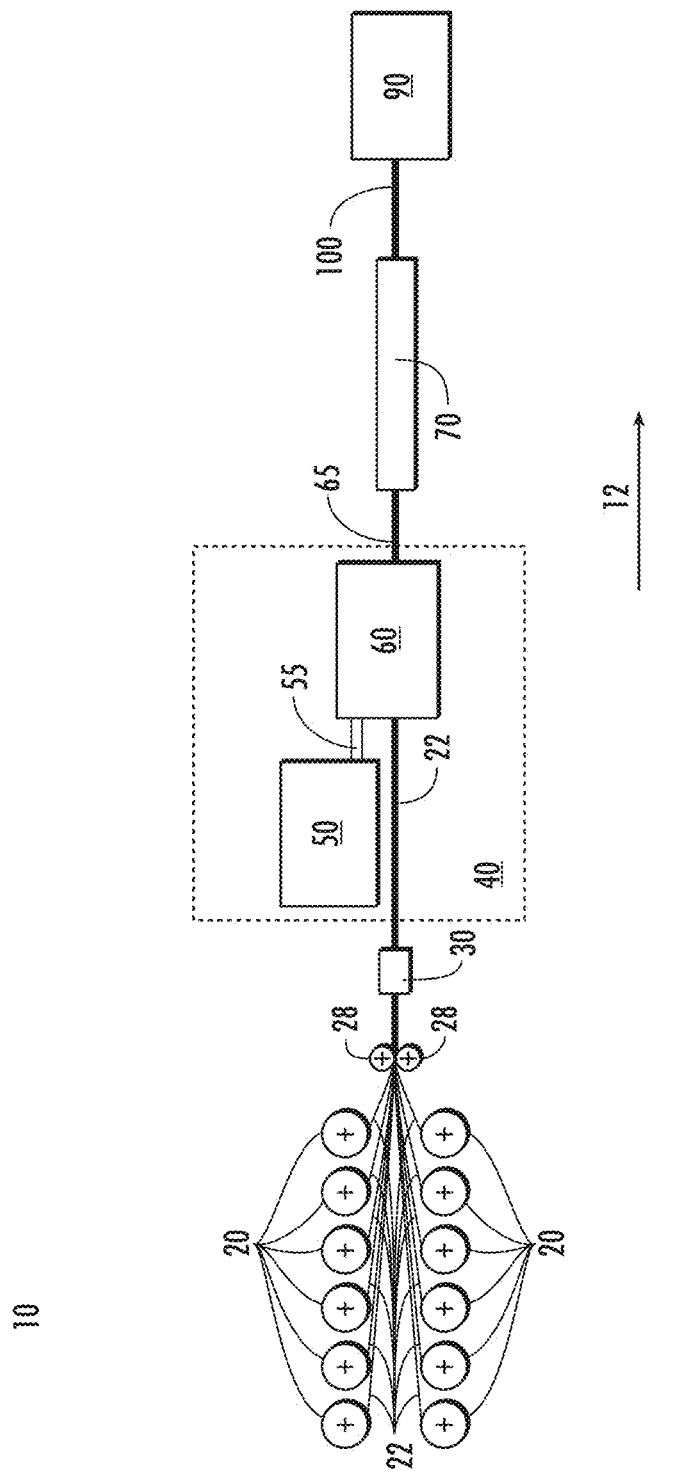
FIG. 1 is a schematic representation of an exemplary manufacturing line for making fiber optic assemblies according to embodiments of the present invention.

The exemplary methods for manufacturing fiber optic cables and fiber optic cable assemblies according to the present invention have several advantages compared with conventional methods. One advantage is that at least a portion of the particulate matter, which can be in the form of powder particles, are mechanically attached to a surface of the fiber optic assembly (e.g., the tube or cavity interior wall). The attachment may be carried out so that less than all of the surface area of the tube is covered while still effectively blocking the migration of water. The presence of water-swellable powder in the tube is nearly transparent to the craft since low levels of powder are sufficient. The water-swellable powder may be applied to the inside surface of the extruded tube, a cavity, a substrate, or the like to avoid an excess of loose powder in the tube or cavity. Migration of loose powder, such as occurs with conventional injection and fog methods, is thereby mitigated. Tubes or cavities of fiber optic assemblies constructed according to the methods disclosed herein can also have smaller cross-sectional areas than conventional dry cable assemblies that use tape or yarns for waterblocking. The relatively small quantities of powder are less likely to form large agglomerations, which may results in attenuation in optical fibers.

In this specification, "mechanical attachment" of a particle within a substrate, such as an SAP powder particle mechanically attached in an extruded tube, means at least a part of an attached particle extends into or is partially embedded or deposited within the substrate, below the surface of the substrate, as opposed to being solely adhered to the surface of the substrate by means such as adhesives. The mechanical attachment can be caused by a moving particle impinging upon and disrupting the surface of the substrate. Adhesives or binders may be used in addition to mechanical attachment so the two methods are not mutually exclusive. In this specification, the term "powder" is understood to include mixtures of powders of differing type and/or particle size as well as single composition powders. While the present specification describes the supply of particulate matter in the form of powder to various extrusion processes, the disclosed methods of providing powder to manufacturing processes can be used to convey any type of relatively fine particulate matter.

The movement of gases and particulate matter in this specification is often described in terms of "velocity" through a passage, from a nozzle exit, or in an interior area, etc. It is understood that individual gas molecules and individual particles may not travel with a constant velocity or direction, may swirl, etc. Therefore, in this specification, the "velocity" of a gas, gases, particulate matter, or mixtures thereof, refers to average velocity for the plurality of particles, gas molecules, etc., along a process or downstream direction.

This specification describes "motive gas" as conveying particulate matter through a manufacturing line. "Motive gas" is used for brevity of description and is intended to encompass a mixture of individual gases as well as individual gases.

FIG. 1 is a schematic representation of an exemplary manufacturing line 10 for making fiber optic assemblies. The manufacturing line 10 may include a plurality of rotating reels 20 for paying out a plurality of respective optical fibers 22 along a process direction 12. Other means, such as flying off, may also be used to pay off one or more optical fibers. The illustrated manufacturing line 10 illustrates a process utilizing twelve optical fibers 22, but other numbers, including 1, 2, 6, etc., of optical fibers can be used. In some applications, the optical fibers 22 may leave their respective reels 20 with a static charge that can assist in the deposition of powder particles. The optical fibers 22 may, for example, pass from the reels 20 through a set of guide rollers 28 and a guiding die 30. The bundle of fibers 22 then passes into a powder application/extrusion apparatus 40. The powder application/extrusion apparatus 40 is schematically illustrated as a powder/motive gas supply 50 connected to an extrusion apparatus 60 by a powder/motive gas supply passage 55, which may have the general form of a tube. While the apparatuses 50, 60 are schematically illustrated as separate devices, they could, for example, be integrated as a single device and/or station of the manufacturing line 10.

In general, the powder application/extrusion apparatus 40 extrudes a tube around the fibers 22 and applies particulate matter (e.g., powder) to the interior of the tube, which draws down around the fibers to form an uncooled fiber optic assembly 65. The powder/motive gas supply 50 provides the powder and motive gas to convey the powder particles to the extrusion operation, and the extrusion apparatus 60 extrudes the tube around the fibers 22. The uncooled fiber optic assembly 65 may then be cooled in a cooling device 70, which may be, for example, a longitudinally extending trough filled with cooling fluid, such as liquid water. The cooling device 70 cools the recently extruded tube as the fiber optic assembly 65 moves along the process direction 12. The resultant fiber optic assembly 100 is then collected on a take-up device 90, such as, for example, a take-reel or take-up disc.

The Powder/Motive Gas Supply

The operation of the powder/motive supply 50 in supplying powder to the extrusion apparatus 60 is discussed below with reference to FIGS. 2-3C. In the following discussion, the exemplary powder is SAP powder used for waterblocking in fiber optic cables. Table 1 below includes a particle size distribution for SAP powder suitable for use in the present embodiment. The principles discussed, however, are applicable to other relatively fine particulate matter, such as, for example, flame-retardant particles (e.g., aluminum trihydrate, magnesium hydroxide, etc.), dry lubricants such as talc, graphite, boron, and/or the like, and/or mixtures thereof.

Figure 2:
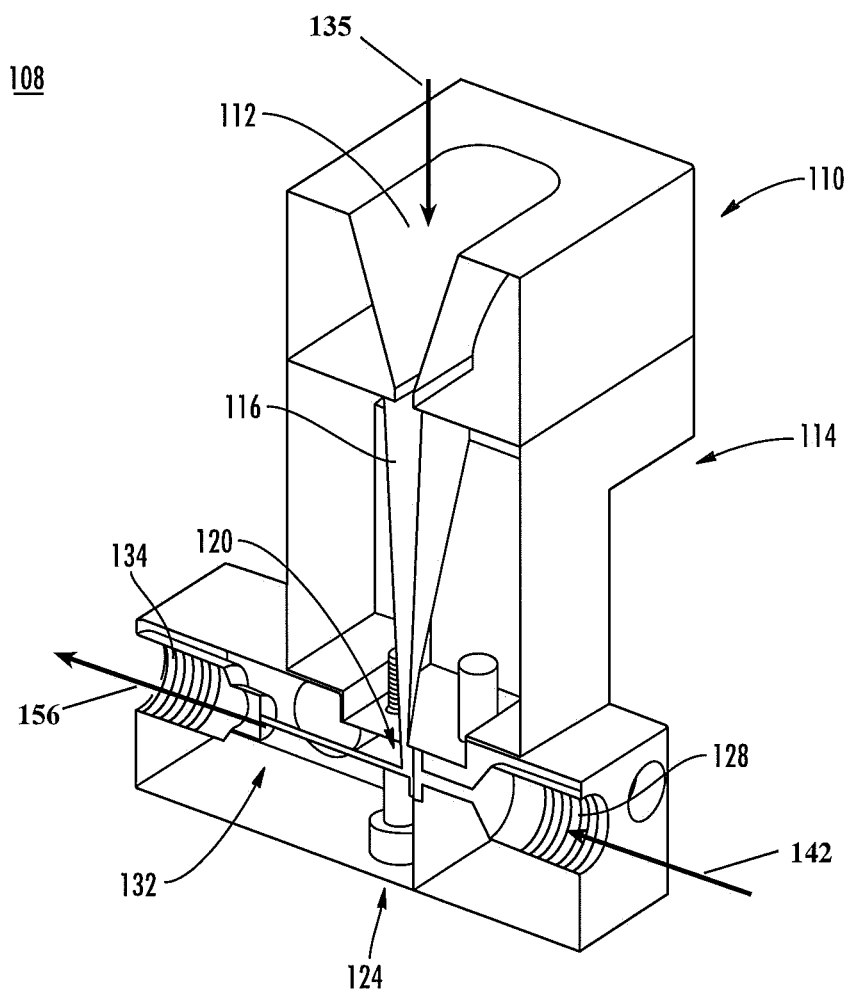
FIG. 2 illustrates a partially schematic cross-sectional perspective view of a venturi powder/gas mixing section of the powder supply illustrated in FIG. 1.

FIG. 2 is a partially schematic cross-sectional perspective view of a powder/gas mixing section 108 of the powder/motive gas supply 50 shown schematically in FIG. 1. The venturi section of the section 108 is shown in more detail in FIGS. 3A and 3B. The powder/gas mixing section 108 may be supplied with powder particles by, for example, vibratory and/or gravimetric particle supply means (not illustrated). One commercially available powder feeder is the Model 6C Vibratory Feeder available from Eriez Manufacturing Co. Vibratory feeders are particularly well suited for use with the present embodiments because of the relatively low powder flow rates used in the extrusion processes.

The powder/gas mixing section 108 is part of a venturi system having a transition funnel 110 with an open, funnel-shaped downwardly-tapered powder receiving portion 112 that receives falling powder or other particulate matter from the supply means. The lower end of the transition funnel 110 is operatively connected to a venturi funnel 114 having a vertically tapered passage 116 that terminates at a metering or powder feed aperture 120 located at the upper end of a venturi block 124. In FIG. 2, the right or intake side of the venturi block 124 includes a threaded intake end 128 that receives a conveying passageway of a motive gas supply, which is discussed in further detail below with reference to FIG. 3A. The left or downstream exiting side of the venturi block 124 includes a stepped passage 132 having a threaded exit end 134 that receives the upstream or intake end of the powder/motive gas supply tube 55 (shown in FIG. 1). The powder/motive gas supply tube 55 may supply the SAP powder consumed by, for example, extrusion processes, as discussed in further detail below.

Figure 3B:
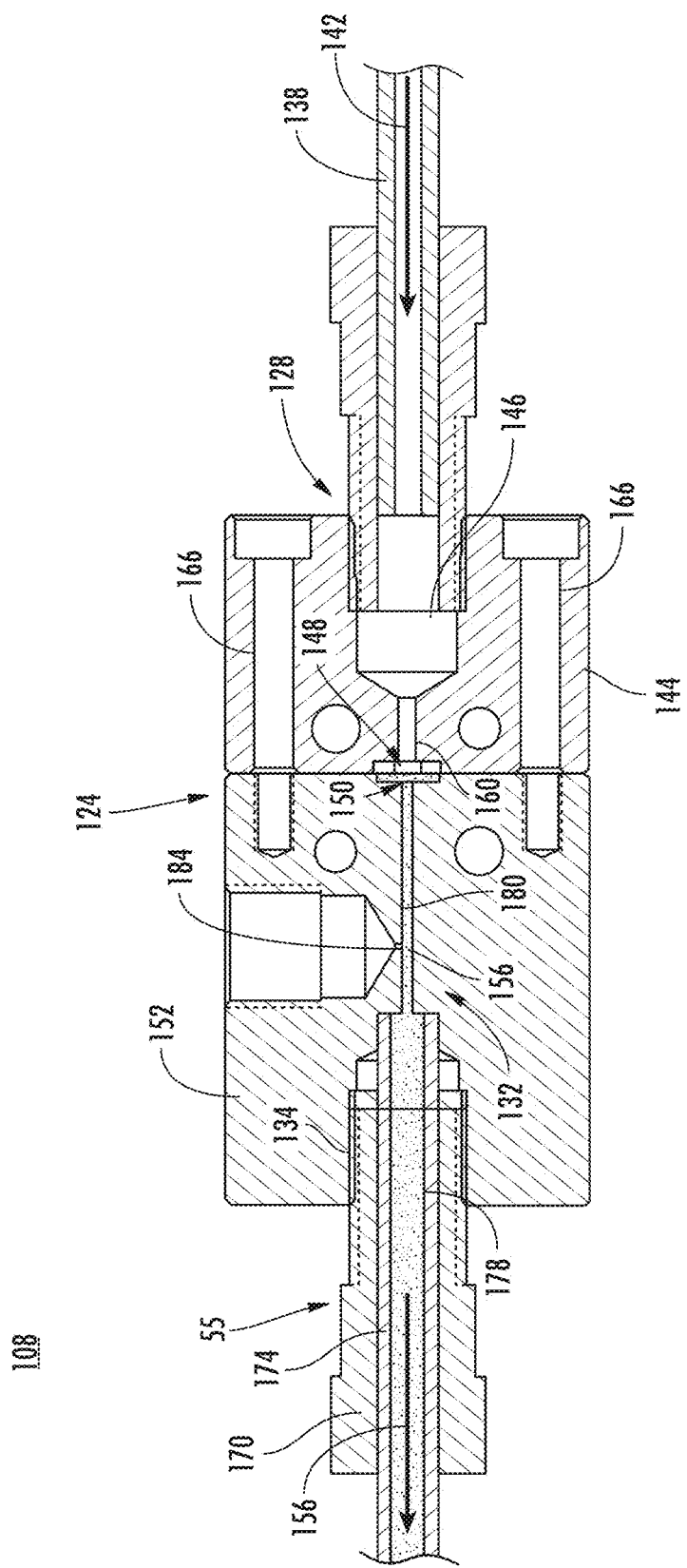
FIG. 3B is a section view taken along line 3B-3B in FIG. 3A.

FIG. 3A is a cross-sectional view of a portion of the powder/gas mixing section 108, with a motive gas supply passage or tube 138 threaded into the intake end 128 of the venturi block 124 and the powder/motive gas supply tube 55 threaded into the exit end 134. FIG. 3B is a section view taken along line 3B-3B in FIG. 3A. Referring to FIGS. 3A and 3B, in operation, the open top of the receiving portion 112 of the transition funnel 110 receives a mixture of atmospheric air and/or other gases and powder particles 135, which in FIGS. 3A and 3B are symbolically illustrated as particulate matter and as entering the transition funnel 110 with a conical shape. The ambient air and/or other gas or gases at the funnel 110 entrance may be at partial vacuum (i.e., at pressures less than ambient). At the same time, a stream of motive gas 142, its direction indicated by an arrow in FIG. 3A, is provided to the motive air supply tube 138 by, for example, a blower, a compressed gas source, etc. (not shown). The motive gas 142 can be, for example, pressurized atmospheric air, or one or more "dry" gases, such as nitrogen, and mixtures of air, dry gases, etc. Dry gases may also be used to convey particles at the receiving portion 112.

Figure 3C:
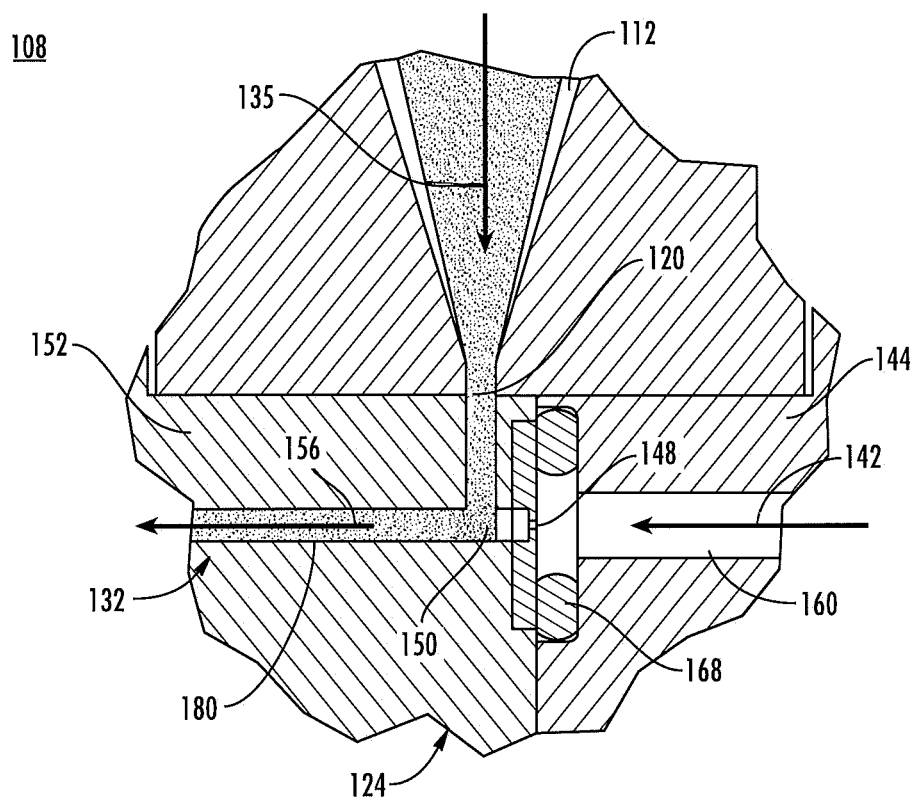
FIG. 3C is an isolated section view taken on line 3C in FIG. 3A.

Still referring to FIGS. 3A and 3B, the motive gas 142 travels down the supply passage 138, which is formed in an upstream or intake piece 144 of the venturi block 124, through an intake chamber 146, and is then forced through a relatively small motive gas orifice 148 (shown in isolation in FIG. 3C). The motive gas 142 then passes below the metering aperture 120 at the upper end of the venturi block 124, where the motive gas 142 mixes with and accelerates the downwardly metered powder particles 135. The movement of the motive gas 142 through the gas intake orifice 148 creates a partial vacuum in a venturi receiving chamber 150 in a downstream piece 152 of the venturi block 124, which assists in drawing the powder particles 135 downwardly through the aperture 120 and into the receiving chamber 150. The partial vacuum in the chamber 150 is caused by the acceleration of and the accompanying pressure drop in the motive gas 142 as it passes through the small motive gas orifice 148, which acts as a venturi orifice. The direction of the accelerated mixture 156 of motive gas and powder particles is indicated by the arrow to the left in the figures. For simplicity of description, the portion of partial vacuum air drawn in with the powder particles 135 through the metering aperture 120 is considered to form a part of the "motive gas" as it mixes with the motive gas 142. Referring specifically to FIG. 3B, the intake chamber 146 is in fluid communication with the motive air orifice 148 via a passage 160 in the upstream piece 144.

FIG. 3C is an isolated view taken on line 3C in FIG. 3A, and illustrates the operation of the venturi block 124 in greater detail. Referring to FIGS. 3B and 3C, the upstream piece 144 of the venturi block 124 can be connected to the downstream piece 152 by threaded attachment members 166, and an o-ring seal 168 can be seated between the upstream piece 144 and the downstream piece 152 to provide a gas-tight seal between the pieces 144, 152 in the vicinity of the motive gas intake orifice 148. The powder/motive gas supply tube 55 has an outer sleeve 170 that may be threaded into the exit end 134 of the venturi block 124, and a concentrically mounted inner passage 174 with an inner bore 178 having, for example, a circular cross-sectional area. As shown in FIGS. 3B and 3C, the stepped bore 132 includes a relatively small venturi passage 180 that conveys the accelerated mixture of motive gas and powder particles 156 downstream through the venturi block 124 and into the powder/motive gas supply tube 55. A transverse monitor port 184 can be formed in the venturi passage 180 for monitoring conditions such as temperature, humidity, particle concentration, pressure, flow velocity, etc., within the venturi passage 180. The venturi passage 180 may have, for example, a circular cross-section. Still referring to FIGS. 3B and 3C, the mixture of motive gas and powder particles advances through the venturi passage 180 and enters the inner bore 178 of the powder/motive gas supply tube 55. The mixture may then be provided to a manufacturing process such as, for example, extrusion processes performed in the extrusion apparatus 60 (illustrated in FIG. 1). Examples of the uses of the mixture of motive gas and powder particles 156 from the powder/motive gas supply 50 in exemplary extrusion processes are discussed in detail below.

According to one aspect of the invention, the venturi powder supply 50 utilizes Bernoulli's principle in that the high velocity of motive gas through the motive gas supply orifice 148 creates a partial vacuum in the chamber 150 immediately downstream of the orifice 148. The powder 135 is thereby drawn through the feed aperture 120 and into the venturi block 124 where it mixes with the relatively low pressure motive gas exiting the orifice 148. The use of a dry motive gas 142 having a low dew point (e.g., 32° F., or 0° C., or lower) reduces the chance of powder agglomeration before the powder particles are applied to a substrate, such as, for example, an extruded tube or cavity. The velocity of the motive gas 142 may be regulated by controlling the pressure upstream of the motive gas orifice 148 to ensure consistent flow through the motive gas supply orifice 148. The velocity of the motive gas 142 as it passes through the orifice 148 may also be controlled by controlling the cross-sectional area of the orifice 148. A comparatively small orifice 148, for example, can be used to create desirable flow velocities and powder densities for supply to manufacturing processes. For example, in some applications, motive gas supply orifice 148 diameters of 0.3 mm (cross-sectional area of about 0.08 mm$^2$) or less provides high velocity flows through the orifice. In another application, orifice diameters of 0.2 mm (cross-sectional area of about 0.03 mm$^2$) or less may be used.

In the venturi block 124, the sum of the motive gas 142 and vacuum gas/powder 138 equals the total flow of gas and powder particles entering the powder/motive gas supply tube 55. The powder/motive gas supply tube 55 receives this combined flow from the relatively small bore venturi passage 180 in the venturi block 124. According to one embodiment of the invention, the powder/motive gas supply tube's inner diameter 178 may be sized such that the velocity of the gas/powder mixture is in the range of 5-20 m/s (meters/second).

For flow velocities below 5 m/s, the flow of a gas/powder mixture may be generally referred to as "dense phase conveyance." In dense phase conveyance, the gas/powder mixture may lack uniformity across the cross section of the supply tube 55, and much of the powder may move along the bottom (as opposed to being supported and conveyed by motive gas) of the powder/motive gas supply tube 55 or in slugs. Further, dense phase conveyance may lead to high pressure drops in the conveying passage. Dense phase conveyance is also undesirable because it can lead to a plugged conveyance tube and/or surging of the gas/powder mixture at the conveyance tube exit.

For flow velocities above 20 m/s, the flow of the gas/powder mixture may be generally referred to as "dilute phase conveyance." In dilute phase conveyance, the powder particles generally occupy less than about 5% of the volume of the powder/gas mixture, although concentrations may vary for differing particle sizes, motive gases, etc. Dilute phase conveyance is desirable because the gas/powder mixture is generally uniform across the cross section of the supply tube 55, which leads to better dispersion of powder when applied to the inner circumference of an extruded buffer tube, for example. However, increasing the flow velocity in the powder/motive gas supply tube 55 may result in high back pressures (e.g., above atmospheric pressure) in the venturi block 124. High back pressures in the block 124 can affect the operation of the venturi in that high pressures at the venturi receiving chamber 150 may inhibit the flow of powder 135 and clog the powder metering aperture 120.

Flow velocities falling generally within the range of 5-20 m/s, between the ranges for dense phase nor dilute phase conveyance, is referred to herein as "strand phase conveyance." Although strand phase conveyance may not provide the degree of uniformity of powder particle size distribution through the entire cross section of the tube 55 that is possible in dilute phase flow, the length of the powder/motive gas supply tube 55 can be selected to minimize surge of powder within the supply tube 55. Strand phase flows can be used in selected portions of the powder application/extrusion apparatus 40 to avoid or mitigate the high back pressures at the venturi associated with dilute phase flows. The use of particles conveyed in strand phase and in dilute phase flows is discussed below in the context of two exemplary extrusion processes, although the methods and apparatuses for providing such flows discussed above can be used in other applications requiring a flow of particulate matter conveyed by a motive fluids such as gas or mixtures of gases and other fluids.

Several parameters can be used to control the velocity within the powder/motive gas supply tube 55. For example, flow velocity of the gas/powder mixture within the supply tube 55 increases with decreasing cross sectional area of the supply tube 55. However, resistance in the tube may result in high back pressures as discussed above. The device illustrated in FIGS. 3A-3C can operate at, for example, a back pressure of up to 172.3 mBar, measured at the monitor port 184. Higher back pressures may result in a positive gauge pressure at the chamber 150. Back pressures experienced in generating dilute phase flows may, for example, be relieved by setting the gas/powder velocity through the powder/motive gas supply tube 55 to fall within the range of strand phase conveyance.

EXAMPLE 1

A powder/gas mixing section 108 as shown in FIGS. 2-3C has a motive gas orifice 148 of 0.25 mm diameter (cross-sectional area of about 0.05 mm$^2$). The incoming flow volume of the motive gas 142 at the motive gas orifice 148 is about 2.5 l/min. (liters/minute). The velocity of the motive gas flow as it exits the orifice 148 is at least Mach 1. The flow volume of the vacuum air drawn in with the powder 135 is about 1.7 l/min. The mixture of motive gas and powder in the venturi passage 180 is in dilute phase conveyance at a velocity of about 80 m/s. Powder 135 is conveyed through the venturi block 124 at a rate of about 2 grams/min. The powder is then conveyed through a 3.05 mm diameter passageway for a distance of 1.5 m in strand flow conveyance to an extrusion apparatus.

Extrusion with Powder Supply Through an Annular Passage

An exemplary method of extrusion of a tube around optical fibers and application of powder in the tube is discussed below with reference to FIGS. 1 and 4A-4C.

Figure 4A:
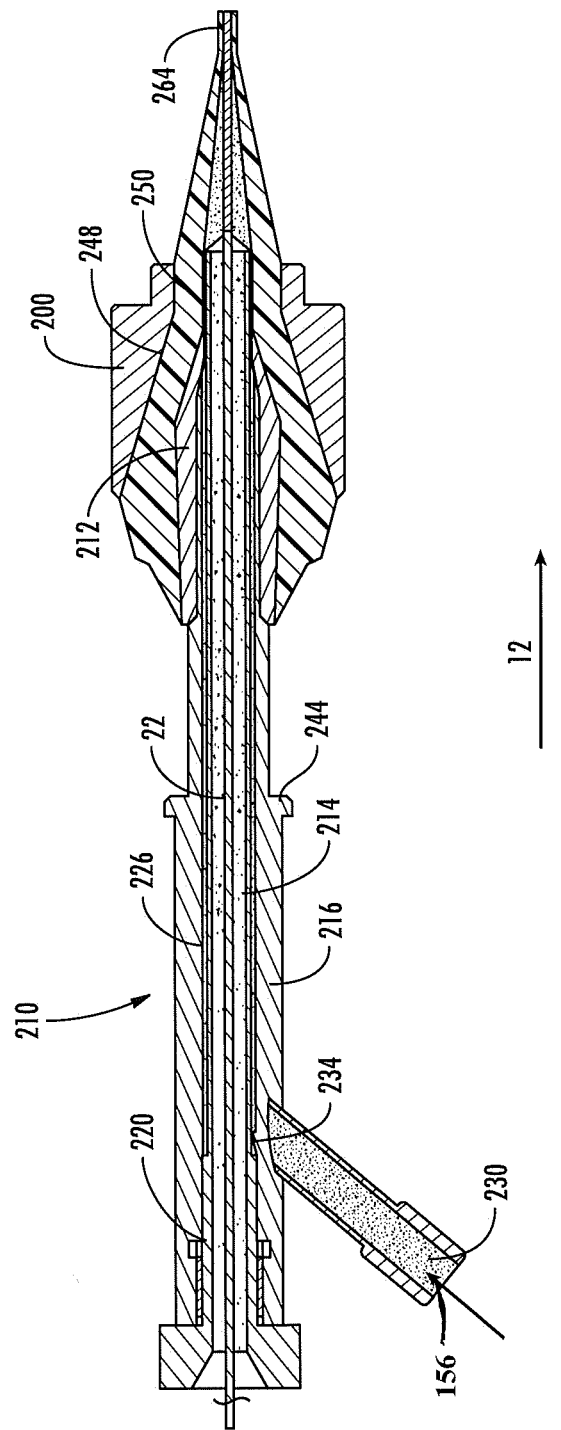
FIG. 4A is a section view of an apparatus performing an extrusion process and a powder application process according to an embodiment of the invention.

As shown in FIG. 1, the powder/motive gas supply 50 supplies powder to the extrusion apparatus 60 via the powder/motive gas supply passage 55. The powder and motive gas are used in an extrusion process used to form a tube. FIG. 4A is a partial section view of selected portions of the extrusion apparatus 60 that utilizes the powder and motive gas from the supply passage 55 in the extrusion process. FIG. 4A illustrates a crosshead extrusion die 200, a powder/motive gas supply assembly 210, and an extrusion tip 212 concentrically mounted on the downstream end of the assembly 210. The components 200, 212 illustrate a portion of the extrusion apparatus 60, and can be connected to the assembly 210, and incorporated into a surrounding crosshead extrusion apparatus of conventional design, the details of which are omitted for the sake of brevity.

Referring to FIG. 4A, the powder/motive gas supply assembly 210 includes a central fiber guide passage 214 through which the plurality of optical fibers 22 pass during the extrusion process. The fiber guide passage 214 may have, for example, a circular cross section. The powder/motive gas supply assembly 210 comprises an elongate tubular outer sleeve 216 and an elongate tubular inner sleeve 220 mounted concentrically within the outer sleeve 216. An annular passage 226 is defined between the inner and outer sleeves and is arranged to convey powder and motive gas through the powder/motive gas supply assembly 210. A powder/motive gas intake stem 230 is formed in the powder application/extrusion piece 210 and is in communication with the annular passage 226 via an intake port 234. The powder/motive gas intake stem 230 is adapted to receive the downstream end of the powder/motive gas supply tube 55, or an intermediate conveyance, such as a hose, that is connected to the downstream end of the supply passage 55. The mixture of motive gas and powder particles supplied by the powder/motive gas supply 50 is thereby conveyed into the annular passage 226 of the powder/motive gas supply assembly 210.

The extrusion tip 212 is mounted concentrically with the downstream end of the outer sleeve 216, and a portion of the extrusion crosshead (not shown) abuts a stop edge 244 on the outer sleeve 216. The downstream end of the extrusion tip 212 and the downstream end of the powder/motive gas supply assembly 210 are in turn mounted concentrically within the extrusion die 200. The region between the extrusion die 200 and the inner guide 212 defines an annular channel 248 through which molten liquid extrudate 250 is provided for the extrusion process. The source (not illustrated) of molten extrudate may be any conventional means.

Figure 4B:
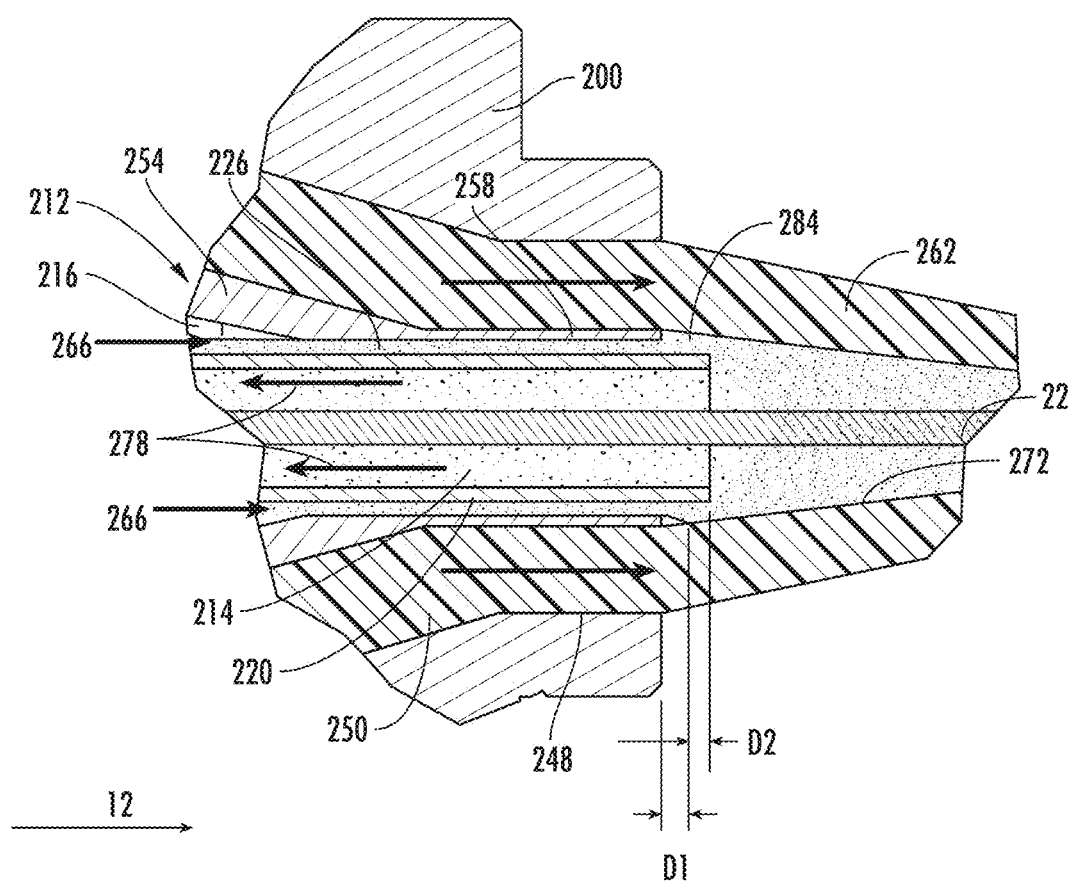
FIG. 4B is an isolated section view of the extrusion and powder application processes shown in FIG. 4A.

FIG. 4B is an isolated section view of the extrusion apparatus 60 illustrating the extrusion/powder application process in the vicinity of the extrusion die 200. As shown in FIG. 4B, the extrusion tip 212 has a tapered portion 254 that terminates at a cylindrical tip portion 258. The inner sleeve 220 of the powder/motive gas supply assembly 210 extends concentrically through the cylindrical portion 258, and may terminate at a location adjacent to the downstream end face of the cylindrical tip portion 258. The downstream end of the annular channel 226 is defined as the annular space between the downstream end of the inner sleeve 220 and the extrusion tip 212.

Still referring to FIG. 4B, in operation, the optical fibers 22 advance through the passage 214 in the inner sleeve 220 in the process direction 12. As the fibers 22 advance through the inner sleeve 220, molten extrudate 250, which is in a soft, energy absorbing state, is advanced through the extrudate channel 248 generally in the direction of the heavy black arrows. The extrudate 250 forms an extrusion cone 262 around the fibers 22 that eventually shrinks radially or "draws down" and forms the tube around the fibers 22 (the drawn down tube is indicated by reference sign 264 in FIG. 4A). In the exemplary embodiment, the tube is a loose-fitting tube, although other tube forms are possible. An "extrusion cone" can be generally defined as the zone of molten or partially molten extrudate 250 between the downstream end of the extrudate flow channel 258 and the point where the extrudate is fully drawn down. The extrusion cone can, for example, extend into the cooling trough (illustrated in FIG. 1). It is understood that the term "extrusion cone" encompasses extrudate forms that deviate from a perfect conical shape, and includes, for example, tapered extrudate forms having concave and/or convex exterior surface contours, as appreciated by those of skill in the art. During the extrusion process, the mixture of motive gas and powder particles supplied by the powder/motive gas supply tube 55 travels through the annular channel 226 in a direction indicated by the arrows 266, which may be generally parallel to the process direction 12, and is introduced into the interior 272 of the extrusion cone 262.

As the gas/powder mixture is launched into the hot extrusion cone 262, the powder particles have sufficient momentum so that they collide with the interior 272 of the extrusion cone 262. The gas/powder mixture may be conveyed through the annular channel 226 with sufficient velocity so that the particles' momentum causes all or a significant portion of the particles to become lodged in, embedded, or otherwise mechanically attached to the interior of the hot extrudate, particularly within the extrusion cone 262. In certain applications, a portion of the powder may be adhered to exterior surfaces of the fibers 22. During extrusion, the introduction of a gas flow is required to keep the tube from collapsing under atmospheric pressure while the extrudate tube is still molten. The motive gas from the channel 226 may be of a relatively low flow rate so as not to excessively distort the shape of the extrusion cone 262 during extrusion, while also conveying the powder particles into the extrusion cone 262. As the extrusion cone 262 closes around the fibers 22, the motive gas and excess powder not consumed by the process are returned through the fiber guide passage 214 in the direction of the arrows 278, counter to the process direction 12. Powder is therefore introduced into extrusion cone without adversely affecting the dimensional stability of extrusion process.

The particulate matter in the gas/powder mixture 266, if having sufficient momentum, can partially embed at various locations in the extrudate. In general, extrudate having a temperature of at least 160° C. provides an application area that allows at least partial embedment of particulate matter. For more effective attachment, the extrudate can be at a temperature of at least 200° C. in the attachment area.

A portion of the particulate powder launched through the annular opening 284 may not become mechanically attached to the interior surface of the extruded tube through partial embedment. For example, up to 30% by weight of the particulate matter supplied to the extrusion process, and in some embodiments, up to 40%, or more particularly 60% by weight of the supplied particulate matter may mechanically attach to the tube, with the remainder either remaining loose in the tube or being discarded. For example, a portion of the unattached powder, along with the motive gas, can be exhausted through the opposite end of the passage 214, or, if desired, recirculated for reuse in the extrusion process. About 10-25% by weight of the total powder, for example, may be exhausted out of the tube. A portion of the unused powder may also be conveyed forward into the tube by the optical fibers 22 and remain loose in the tube. About 25-45% by weight of the total supplied particular matter, for example, may remain loose in the tube. The passage 214 can be in communication with a filter, such as a HEPA filter, a collection vessel, or other means for collecting the exhausted unused powder and/or the unused motive gas.

For the quantity of particulate matter that remains in the tube, including the powder either loose, mechanically attached, and a small amount adhered to the fibers, about 45-80% by weight of that quantity may be mechanically attached to the interior of the tube. High levels of mechanically attached powder can be reliably obtained by varying process parameters such as particulate launch momentum. For example, up 60% by weight, or in some embodiments, up to 80% or even 90% by weight, of the total powder quantity in the tube can be mechanically attached to the tube interior. The total percentage of powder by weight mechanically attached can be determined by averaging the measured or calculated weight of the mechanically attached powder per meter length divided by the total weight of the powder per meter length disposed within the tube or cavity. Conversely, the total percentage of powder by weight loosely disposed can be determined by averaging the measured or calculated weight of the loosely disposed powder per meter length divided by the total weight of the powder disposed within the tube or cavity.

According to the present embodiments, fiber optic assemblies can also have relatively small average concentrations of powder per meter of tube. Low average concentrations render the powder in the tube nearly transparent to the craft. The "average concentration" of powder or other particulate matter in a tube is the total weight of particulate matter per unit length of tube, and may be expressed as grams of particulate matter per meter of tube (g/m), or equivalently, milligrams per millimeter (mg/mm). The average concentration can then be used to calculate a "normalized concentration" in order to scale the concentration by tube inner or cavity cross-sectional area. The normalized concentration per square millimeter of cavity cross-sectional area is calculated by dividing the average concentration by the cavity cross-sectional area. The term "normalized concentration" is used in lieu of "volume concentration" because the particulate matter will not be evenly distributed throughout the tube's interior volume. Tubular fiber optic assemblies according to the present embodiments can be formed with low average and normalized powder concentrations yet still have sufficient water-blocking so as to block a one-meter pressure head of tap water within a one meter length for twenty-four hours. In one example, a tube has an average concentration of about 0.02 grams of powder per meter length for a tube having a 2.0 millimeter inner diameter. The cavity cross-sectional of about 3.14 square millimeters yields a normalized concentration value of about 0.01 grams of water-swellable powder per meter length of the tube assembly when rounded up. In another example, a tube has an inner diameter of 1.6 mm and an average concentration of about 0.0085 grams per meter of tube. The normalized concentration is about 0.004 gram of powder per meter length of tube per square millimeter of cavity cross-sectional areas. According to the present embodiments, low powder normalized concentrations of 0.01 or less, and even as low as 0.005 or less, provide desirable waterblocking characteristics, such as the ability to block a one-meter pressure head of tap water within a one meter length for twenty-four hours. Generally speaking, as the cross-sectional area of the cavity of the tube or the like increases, the amount of water-swellable powder needed for effectively blocking the migration of water along the same may increase generally proportionately for effective water-blocking.

According to one aspect of the invention, the powder particles can be passed or launched into the interior of the extrusion cone through the annular opening 284 formed between the concentrically arranged inner sleeve 220 and cylindrical tip portion 258 of the extrusion tip 212, which define the terminal end of the annular channel 226. The point of exit or launch of powder from the annular opening 284 is therefore immediately adjacent to the extrusion cone 262 that is in part defined by the extrusion tip 212. The proximity of the annular opening 284 to the extrusion cone 262 ensures that minimal kinetic energy of the powder particles is dissipated before the powder particles strike the interior 272 of the extrusion cone. At the point of exit or launch of the gas/powder mixture from the annular opening 284, the extrusion cone 262 interior cross sectional area is much greater than the cross sectional area of the annular opening 284. The increase in cross sectional area that the gas/powder mixture encounters may cause the gas velocity to drop below the saltation velocity, which could cause the powder to fall out of the conveying gas. However, the momentum of the powder particles permits the particles to travel for a short distance at a velocity greater than the gas and to adhere, embed or otherwise mechanically attach to the inside of the extrusion cone 262. The nearness of the annular opening 284 to the interior 272 of the extrusion cone 262 ensures a significant portion of the powder particles retain sufficient momentum to mechanically attach to the cone.

Referring to FIG. 4B, according to one embodiment of the invention, the downstream face (i.e., the face to the right in FIG. 4B) of the extrusion die 200 can be a distance D1 in the range of +/−3 mm from the downstream face of the cylindrical tip portion 258 of the extrusion tip 212. The end of the cylindrical tip portion 258 can be tapered so that the gas/powder mixture exiting the cylindrical channel 226 impinge essentially directly on the extrudate 250. The downstream face of the cylindrical tip portion 258 can be a distance D2 in the range of +/−3 mm from the downstream face of the inner sleeve 220. Further, the downstream face of the inner sleeve 220, as well as the downstream face of the cylindrical tip portion 258, can be downstream of the downstream face of the extrusion die 200. In this configuration, the ends of the tip 212 and the sleeve 220 lie inside of the extrusion cone 262 so that the powder particles are launched from the channel 226 at a launch area that lies inside of the extrusion cone 262. In another embodiment, the downstream face of the extrusion die 200 may be 0-5 mm upstream of the downstream face of the cylindrical tip portion 258.

In order to provide a desired degree of attachment of the powder particles to the extruded tube, the velocity of the gas/powder mix at the annular opening 284 may be in the range of 2 m/s to 50 m/s. The velocity at the annular opening may be, more particularly, at least 5 m/s. For example, for powder particles having an average particle size of about 60 microns or less, a flow velocity of at least 5 m/s (i.e., strand phase flow) at the annular opening 284 imparts sufficient momentum to the particles so that particles mechanically attach to the molten extrudate. According to this embodiment, the mixture of powder and motive gas may be conveyed in strand phase conveyance through the powder/motive gas supply passage 55, and introduced into the extrusion process at strand flow velocities. At least 40% by weight of powder supplied to the process, or, in the range of 45-80% by weight of the total amount of powder that remains in the tube may be adhered to the tube interior using this process.

The powder/motive gas supply assembly 210 may, for example, be constructed so that the relative axial location of one or more of the inner sleeve 220, the extrusion tip 212, and the extrusion die 200 can be varied. For example, the downstream end of the extrusion tip 212 can be axially adjustable with respect to the extrusion die 200. Referring to FIG. 4A, the extrusion tip 212 can be threadably mounted in the extrusion crosshead (not illustrated) so that it can be axially translated with respect to the extrusion die 200. Referring back to FIG. 4B, the distance D1 can therefore be varied to obtain desired flow properties at the annular opening 284. Similarly, the axial location of the inner sleeve 220 can be varied with respect to the extrusion tip 212 and with respect to the extrusion die 200. The inner sleeve 220 can, for example, be threadably mounted in the outer sleeve 216 to that the distance D2 can be varied.

EXAMPLE 2

An extrusion process utilizes the powder/motive gas supply 50 to provide powder and motive gas to the extrusion apparatus illustrated in FIGS. 4A and 4B. The powder/motive gas supply 50 provides an SAP powder mixture to the powder/motive gas supply passage 55 in strand phase conveyance, having a motive gas velocity of about 10 m/s. The diameter of the motive gas orifice 148 is between 0.1 and 0.3 mm (cross-sectional areas of about 0.008 mm$^2$ and 0.07 mm$^2$). The flow rate of the motive gas 142 is between 0.5 l/min and 5 l/min. The proportion of powder to air by volume is between 0.01-2.0%. The powder flow rate is between 0.05-10 gram/min. The powder/motive gas mixture is subsequently conveyed to the annular passage 226, where it is conveyed in strand flow at a velocity of about 5 m/s. The average particle size for the powder is in the range of about 30 micrometers, with a size distribution in the range of about 0-63 micrometers as generally described in Table 1. The motive gas/powder mix is launched from the annular passage 226 at a velocity in the range of 5-8 m/s. The tube is polypropylene with an inner diameter of 1.6 mm and is at a temperature of about 230° C. in the powder application zone. At least 40% by weight of the powder supplied to the extrusion process becomes mechanically attached to the extruded tube. About 45-80% by weight of the powder in the tube is mechanically attached. The normalized concentration is less than 0.01 grams of powder per meter of tube per square millimeter of tube inner cross-sectional area.

Extrusion Utilizing Powder Supply Through a Nozzle

Figure 5B:
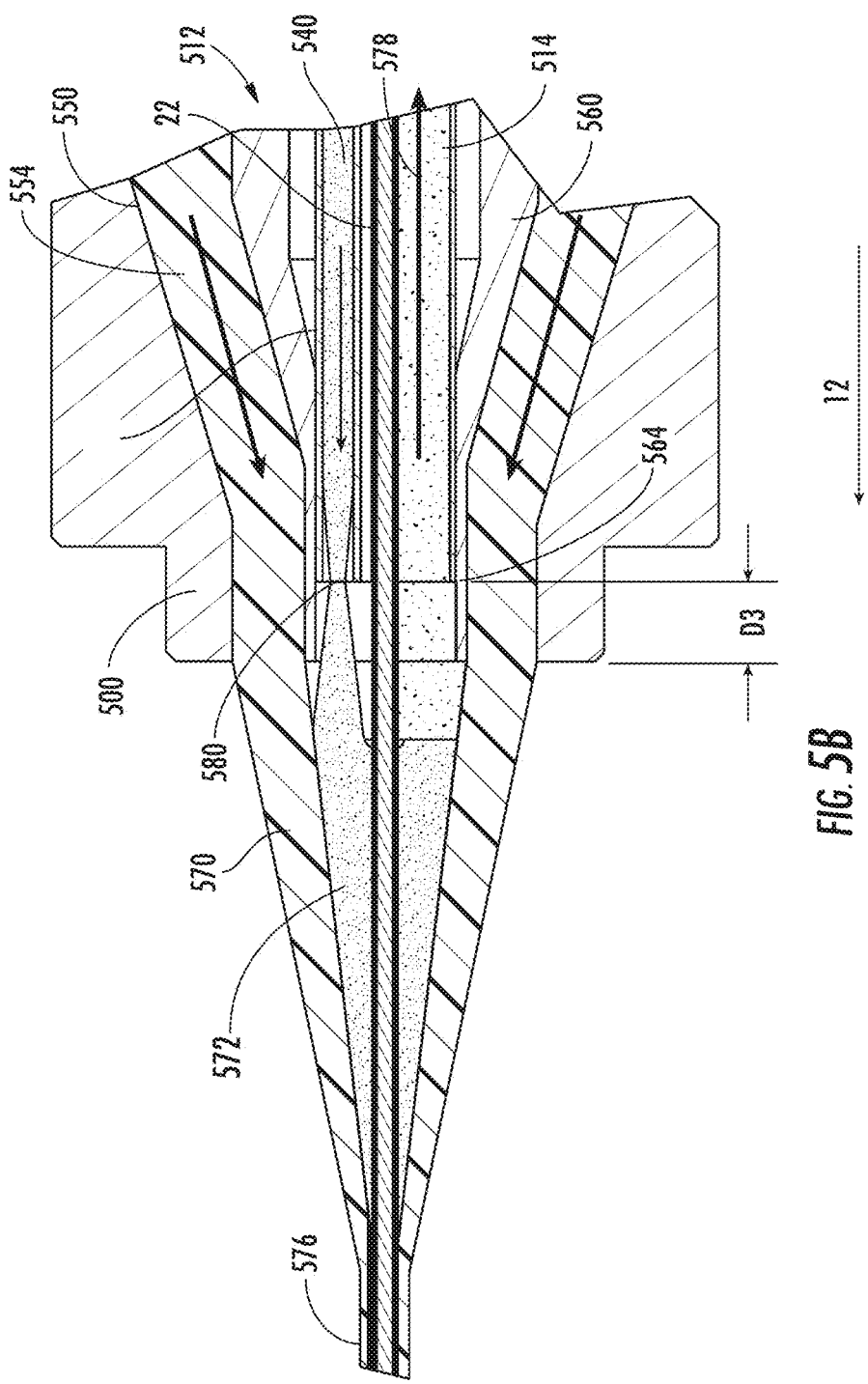
FIG. 5B is an isolated section view of the extrusion and powder application processes shown in FIG. 5A.
Figure 7B:
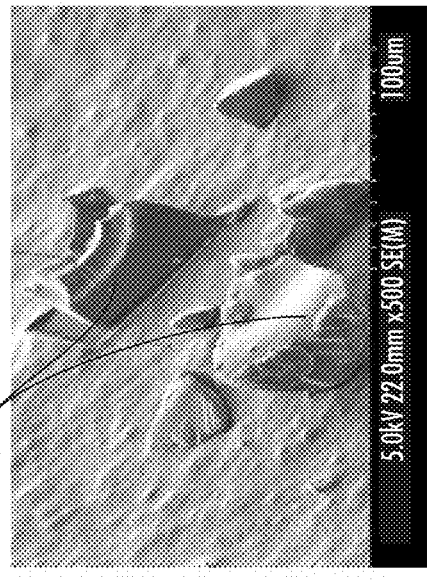
FIGS. 7A-7D are photographs at varying magnifications illustrating mechanical attachment of SAP particles to a tube interior.
Figure 7D:
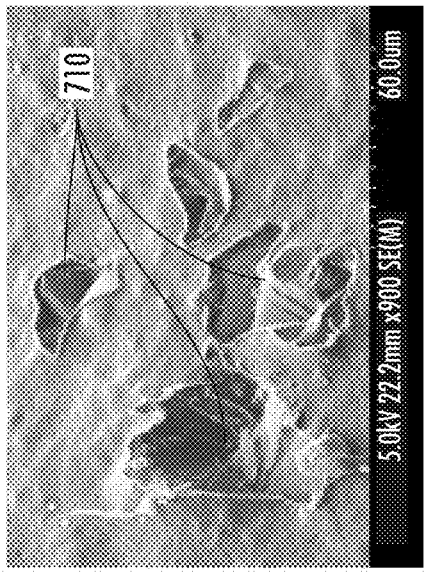
Figure 7A:
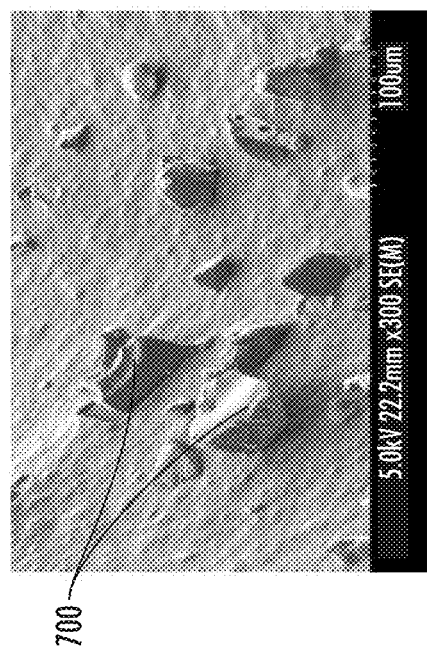
Figure 7C:
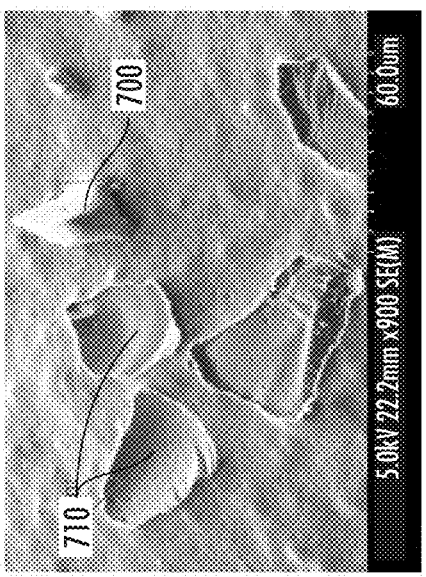

Another exemplary method of extrusion of a tube around optical fibers and application of powder thereto are discussed below with reference to FIGS. 1 and 5A-5B. In the embodiment of FIGS. 5A and 5B, particulate matter is introduced into the extrusion process through a nozzle rather than an annular opening.

Referring to FIG. 1, the powder/motive gas supply 50 supplies powder to the extrusion apparatus 60 via the powder/motive gas supply passage 55. FIG. 5A is a partial section view of the extrusion apparatus 60, which includes a crosshead extrusion die 500, a powder/motive gas supply assembly 510, and an extrusion tip 512 mounted on the downstream end of the powder/motive gas supply assembly 510. The components 500, 510, 512 can be incorporated into a crosshead extrusion apparatus of conventional design, the details of which are omitted for the sake of brevity.

Referring to FIG. 5A, the powder/motive gas supply assembly 510 includes a central fiber guide passage 514 through which the plurality of optical fibers 22 pass during the extrusion process. The powder/motive gas supply assembly 510 comprises an injection head portion 516 joined to an entry head 518 by a collar 520 and a connecting nut 522. An exhaust piece 526 having an exhaust port 528 can be attached to the entry head 518 by, for example, a detent mechanism (not shown) disposed in the transverse opening 530. Alternatively, the entry head 518 and the exhaust piece 526 can be a unitary piece. A powder/gas intake port 536 is defined in the entry head 518 and is in communication with a powder/gas passage 540 in the injection head 516. A powder/gas intake stem or other device (not illustrated) may be formed in or attached to the entry head 518 in communication with the powder/gas intake port 536. The intake stem is adapted to receive the downstream end of the powder/motive gas supply passage 55, or an intermediate conveyance, such as a hose, connected to the passage 55. The mixture of motive gas and powder particles supplied from the powder/motive gas supply passage 55 is thereby conveyed into the powder/gas passage 540.

The powder/motive gas supply assembly 510 can be mounted to a crosshead extrusion apparatus by inserting the injection head 516 into the extrusion apparatus, from left to right in FIG. 5A, until the tapered portion 548 abuts the extrusion apparatus. The connecting nut 522 is slid over the injection head 516 along with the collar 520. The entry head 518 is then threaded into the collar 520 by rotating the collar. The port 536 and the short longitudinal passage in the entry head 518 can be aligned with the powder/gas passage 540 in the injection head 516 by, for example, a dowel (not illustrated) that prevents relative rotation between the injection head 516 and the entry head 518. The extrusion tip 512 is mounted concentrically with the downstream end of the injection head 516 and forms a channel 550 with the extrusion die 500 through which molten extrudate 554 flows during extrusion.

FIG. 5B is an isolated section view of the extrusion apparatus 60 illustrating the extrusion/powder application process in the vicinity of the extrusion die 500. As shown in FIG. 5B, the extrusion tip 512 has a tapered portion 560 that terminates at a terminal downstream (i.e., to the left in FIG. 5B) cylindrical portion 564. The end of the injection head 516 extends concentrically through and is seated within (e.g., may abut) the interior of the cylindrical portion 564, and may terminate at a location adjacent to the end of the cylindrical portion 564.

In operation, the optical fibers 22 advance through the powder/motive gas supply assembly 510 along the process direction 12. As the fibers 22 advance, molten extrudate 554, which is in a soft, energy-absorbing state, is advanced through the channel 550 in the direction of the heavy black arrows, and forms an extrusion cone 570 around the fibers 22 that eventually draws down and forms the tube 576 around the fibers 22. The tube 576 may be, for example, a loose fitting tube, although tight fitting tube forms such as tight buffer tubes are also possible. During the extrusion process, the mixture of motive gas and powder particles supplied by the powder/motive gas supply tube 55 travels through the powder/gas passage 540 and is introduced or launched into the interior 572 of the extrusion cone 570.

As the gas/powder mixture enters the extrusion cone 570, powder particles impinge the interior 572 of the hot extrusion cone 570. The momentum of the particles causes a significant portion of the particles become adhered, embedded, or otherwise mechanically attached to the interior of the hot extrudate, particularly within the extrusion cone 570. In certain applications, a portion of the powder may be adhered to the fibers 22. During extrusion, the motive gas may be used to maintain the shape of the extrusion cone 570 during extrusion, and also serves to convey the powder into the extrusion cone 570.

As discussed above, a portion of the total particulate powder launched through the nozzle 580 may not become mechanically attached to the interior surface of the extruded tube. As the extrusion cone 570 closes around and adheres to the fibers 22 to form the tube 576, the powder and motive gas not consumed by the process are returned through the fiber guide passage 514 in the direction of the arrow 578. The motive gas and a portion of the unattached powder is exhausted through the exhaust port 528 in the exhaust piece 526 (FIG. 5A). A portion of the unattached powder may also be conveyed forward into the tube by the optical fibers 22 and remain loose in the tube. The exhaust port 528 can be in communication with a filter, such as a HEPA filter, a collection vessel, or other means for collecting the unused powder and/or the unused motive gas. A portion of the unused powder may also be conveyed forward by the optical fibers 22.

According to one aspect of the invention, a nozzle 580 of smaller cross-sectional area (e.g., a smaller diameter) than the powder/gas passage 540 can be included at the end of the passage 540 to accelerate the flow of gas and powder. The nozzle 580 may be constructed, for example, to accelerate the flow to dilute phase velocities as it is discharged or launched from the nozzle exit. At the exit or launch point of the gas/powder mixture from the nozzle 580, the extruded cone 570 interior cross sectional area is much greater than the cross sectional area of the powder/gas passage 540. The increase in cross sectional area that the gas/powder mixture encounters may cause the gas velocity to drop below the saltation velocity, which may cause the powder to fall out of the conveying gas. However, the momentum of the powder particles can be selected to permit the particles to travel for a short distance at a velocity greater than the gas and to adhere, embed or otherwise mechanically attach to the inside of the extrusion cone 570.

In order to provide adequate attachment of the powder particles to the extruded tube, the velocity of the gas/powder mix exiting the nozzle 580 may be in the range of 2 m/s to 100 m/s. For example, for powder having a particle size distribution as shown in Table 1, a flow velocity of at least 20 m/s at the nozzle 580 imparts sufficient momentum to the particles so that at least 40% of the supplied particles mechanically attach to the molten extrudate. The exit of the nozzle 580 may be relatively close to the interior surface of the extrusion cone. For example, the nozzle exit may be within +/−7 mm of the downstream face of the extrusion die 500.

Referring to FIG. 5B, the exit point of the nozzle 580 can be positioned so that it flush or nearly flush (e.g., within =/−0.5 mm) with the end of the extrusion tip 512. In this embodiment, the particulate matter exiting the nozzle 580 retains much of its launch velocity as it strikes the extrusion cone 570. Locating the nozzle 580 at extremely close vicinities to the extrusion cone 570 accordingly ensures high embedment rates for the particles.

The powder/motive gas supply assembly 510 and the surrounding extrusion apparatus may, for example, be constructed so that the relative axial location of the injection head 516 with respect to the extrusion tip 512 can be varied. The injection head 516 may be, for example, threadably mounted to vary the distance with respect to the downstream end face of the extrusion tip 512. The distance D3 from the nozzle 580 to the downstream end of the extrusion tip 512, and accordingly the distance of the nozzle 580 to the extrudate, can then be varied. The extrusion tip 512 can be also threadably mounted so that the extrusion tip 512 and/or the injection head 516 can be axially translated with respect to the downstream end of the extrusion die 500. The axial position of the nozzle 580 with respect to the extrusion die 500 and with respect to the extrusion tip 512 can therefore be varied to obtain desired launch properties for the mix of gas and particulate matter.

Figure 11:
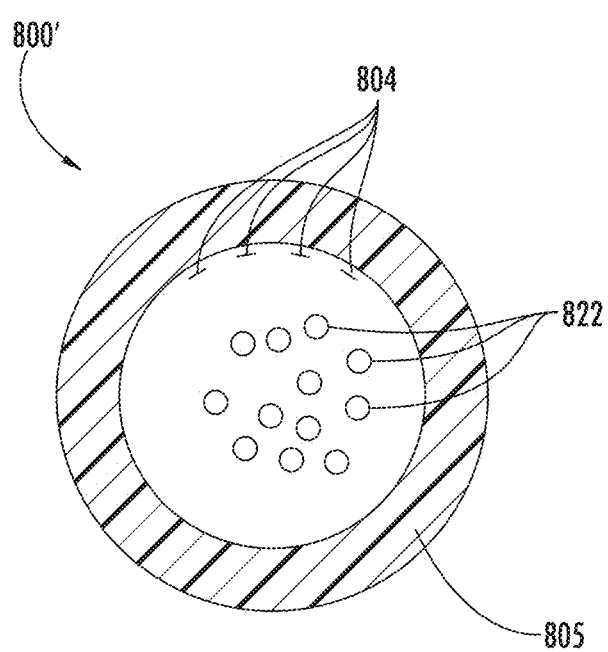
FIG. 11 is a cross-sectional view of another fiber optic cable manufactured according to the present invention.

The arrangement of the nozzle 580 with respect to the interior surface of the tube allows targeted application of the powder to the extrusion cone 570. As shown in FIG. 5B, the powder particles will have their greatest momentum at the exit of the nozzle 580, which is offset with respect to the axial centerlines of the extrusion cone 570, the optical fibers 22, and the end of the extrusion die 500. A targeted section of the interior of the extrusion cone 570 therefore receives a majority of the particulate matter. An example of targeted application of powder particles is discussed below with reference to FIG. 11.

EXAMPLE 3

An extrusion process utilizes the powder/motive gas supply 50 to provide powder and motive gas to the extrusion apparatus illustrated in FIGS. 5A and 5B. The powder/motive gas supply 50 provides an SAP powder mixture to the powder/motive gas supply passage 55 in strand phase flow, having a motive gas velocity in the range of 3-20 m/s. The diameter of the motive gas orifice 148 is between 0.05-0.3 mm (cross-sectional area of about 0.002 mm$^2$ and 0.07 mm$^2$). The powder/motive gas mixture is subsequently conveyed to the powder/gas passage 540, where it is conveyed in strand phase flow at a velocity in the range of 3-20 m/s. The average size for the powder is in the range of about 0-63 micrometers, with a size distribution as generally described in Table 1. The motive gas/powder mix is launched from the nozzle 580 at a velocity of at least 20 m/s. At least 45% by weight of the powder supplied to the process becomes mechanically attached to the extruded tube. About 45-80% by weight of the powder in the tube is mechanically attached. The normalized powder concentration is less than 0.01 grams of powder per meter of tube per square millimeter of tube inner cross-sectional area.

The extrusion methods discussed above disclose methods for mechanically attaching particles to the interior of an extruded tube during the extrusion process. FIGS. 6A-6D, 7A-7D, and 8A-8D are photographs illustrating varying degrees of mechanical attachment of SAP particles to a tube interior. The photographs were obtained using a scanning electron microscope. In order to obtain the photographs, a fiber optic assembly was cut lengthwise using a razor, carbon coated, and photographed in the scanning electron microscope at a 55 degree tilt. The particles 700 shown in the figures were applied using a nozzle assembly similar to the nozzle shown in FIGS. 5A and 5B.

FIGS. 6A-6D are a set of scanning electron microscope photographs at varying magnifications of a tube for a cable assembly with a size distribution as generally described in Table 1. In the photograph, mechanically attached SAP particles 700 are visible as attached to the interior surface 705 of a tube 708. Attachment marks, or "footprints" 710 are also visible. The footprints 710 in the interior surface 705 may indicate mechanically deformed portions of the interior surface where the photograph technician has removed attached particles to illustrate the depth of the surface deformations. The momentum of the particles 700 imparted by the nozzle launch allowed the portions of the particles to deform the tube wall and at least partially embed in the tube wall.

FIGS. 7A-7D are another set of scanning electron microscope photographs of a tube for a cable assembly at varying magnifications. The mechanically attached SAP particles 700 and footprints 710 are visible on the interior surface 705 of a tube 708.

FIGS. 8A-8D are yet another set of scanning electron microscope photographs of a tube for a cable assembly at varying magnifications. Mechanically attached SAP particles 700 and footprints 710 are visible on the interior surface 705 of a tube 708.

Fiber Optic Assemblies Having Mechanically Attached Powders

Figure 9:
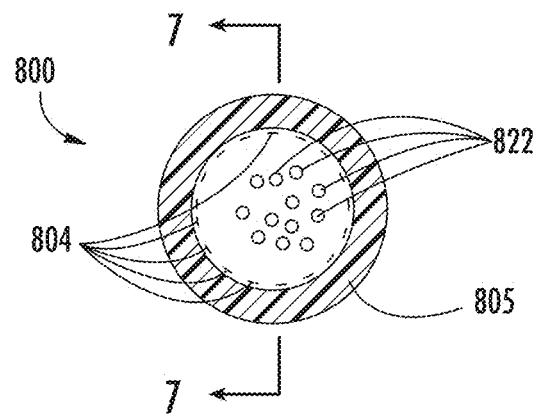
FIG. 9 is a cross-sectional view of a fiber optic cable manufactured according to the present invention.
Figure 10:
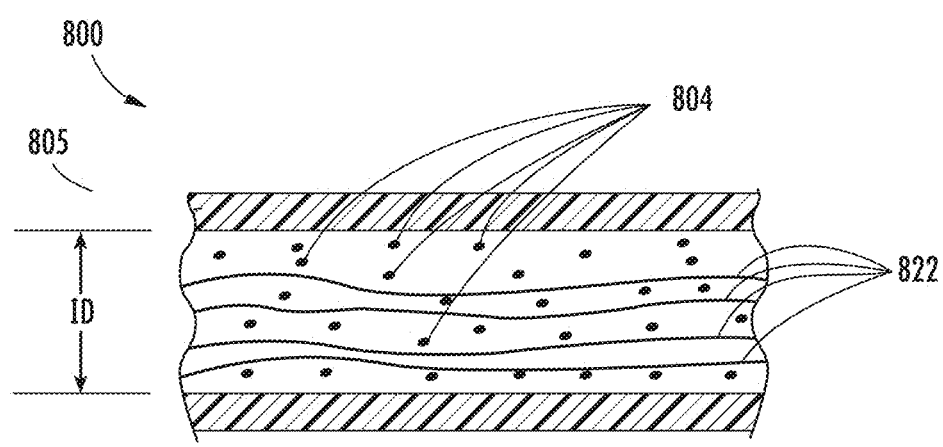
FIG. 10 is another cross-section view of the cable of FIG. 9.

FIGS. 9 and 10 respectively schematically depict a cross-sectional and an enlarged longitudinal cross-sectional view of a fiber optic assembly 800 (i.e., a tube assembly) that can be manufactured according to the above-described methods. The fiber optic assembly 800 includes a water-swellable powder or powder blend 804 within a tube 805, and a plurality of optical fibers 822 extending through the tube. The optical fibers 822 discussed in the present specification may be any suitable type of optical waveguide. Moreover, the optical fibers may be a portion of a fiber optic ribbon, a bundle of optical fiber or the like. In other words, the illustrated optical fibers 822 are non-tight buffered, but the methods of the present invention may be used with optical fibers having other configurations such as tight buffered, ribbonized, stranded, etc. Cables incorporating micromodules may also be constructed according to the principles of the present invention, with the micromodule tubes, for example, including mechanically attached powder. As shown, the water-swellable powder 804 is, generally speaking, represented as disposed about the inner surface of tube 805 with at least a portion thereof mechanically attached to the tube inner wall. Further, the water-swellable powder 804 is mechanically attached to a relatively small percentage of a surface area of the tube inner wall. The presence of the powder is nearly transparent to the craft while being surprisingly effective in its water-blocking performance.

The assembly 800 has a relatively high proportion of its water-swellable powder 804 mechanically attached while still being able to block a one-meter pressure head of tap water within a one meter length for twenty-four hours. As used herein, "tap water" is defined as water having a saline level of 1% or less by weight. Similarly, fiber optic tube assemblies disclosed herein may also block saline solutions up to 3% by weight within 3 meters for 24 hours, and the blocking performance may even stop the 3% saline solution within about 1 meter for 24 hours, depending on the design. Mechanical attachment of the powder allows a portion of an attached water-swellable particle to protrude beyond the surface so that if water enters the cavity it may contact the particle. It is theorized that after the water contacts the water-swellable particle and initiates swelling that some of the particles break free of the surface so they can fully swell and/or move to form a water-blocking plug with other particles.

The water-swellable powder 804 is disposed within an extruded tube having an inner wall with a given surface area per meter length. In one embodiment, about 30 percent or less of the surface area of the inner wall of the tube has water-swellable powder and/or powder blends mechanically attached thereto, but other percentages are possible, such as 25 percent or less. The mechanical attachment may be generally uniformly disposed on the surface area, such as 30 percent or less, of the entire surface as depicted.

Alternatively, mechanical attachment may be concentrated in longitudinal stripes, strips (either interrupted or continuous) in the tube inner wall. For example, 100 percent or less, or more specifically at least 70%, mechanical attachment can be achieved in one or more stripes that cover 30 percent or less of the surface area, with substantially no mechanical attachment at other locations, as shown schematically in FIG. 11. This configuration may be alternatively stated as applying powder within arc sector of the tube interior. For example, arcs of 90 degrees or less, or 60 degrees or less may have mechanically-applied powder particles with the remainder of the tube interior being free of mechanically-attached particles. This type of targeted mechanical attachment may be obtained by, for example, providing a directing extension from the nozzle 580 illustrated in FIG. 5B so that the flow of powder impinges on a specific region of the extrudate cone 570.

Figure 12:
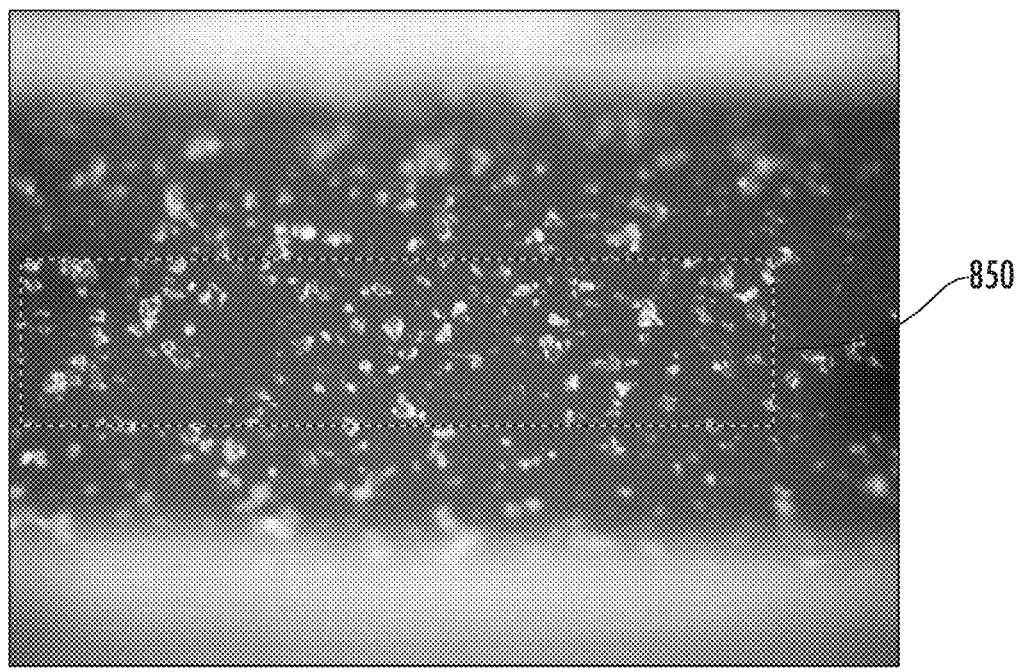
FIG. 12 is a photograph showing a magnified view of the inner wall of a tube having powder mechanically attached thereto with a region of interest depicted by a boxed area.
Figure 13:
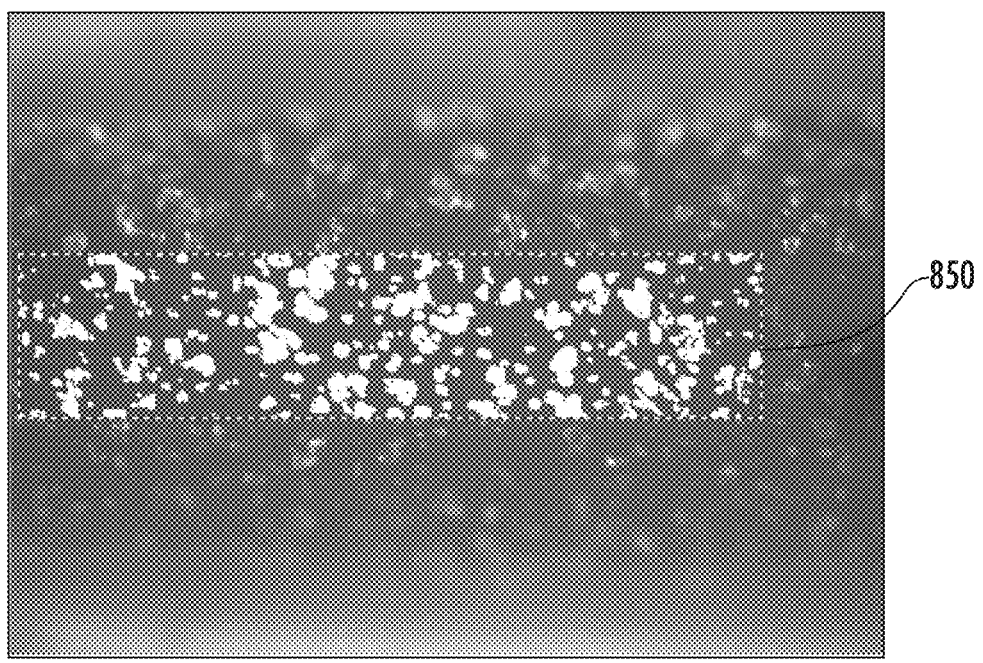
FIG. 13 is the photograph of FIG. 12 with the powder identified using a software package to determine the percentage of surface area of the region of interest that has the powder mechanically attached thereto.

FIG. 12 is a photograph showing a magnified view (about 50×) of the inner wall of an extruded tube having powder mechanically attached thereto by the methods discussed above, viewed using I-Solutions software after any loose water-swellable powder or powder blend has been removed. FIG. 13 is the same photograph shown in FIG. 12 with the powder within the region of interest 850 identified using the software to determine the percentage of surface area within region of interest 850 that is mechanically attached thereto. The software allows the measurement of the percentage of surface area having powder mechanically attached thereto since the gray scale differentiation reveals the surface area having powder mechanically attached thereto relative to the tube wall. When using the software to determine the percentage of surface area having mechanical attachment, the threshold lighting should be properly adjusted to view the contrast between areas. Region of interest 850 shown in FIG. 13 has the powder mechanically attached to about 30 percent or less of the region of interest 850 as depicted. In other embodiments, the powder can be mechanically attached to 25 percent or less of the surface area. Further, from the image the size and shape of the powder are observable.

According to one aspect of the present embodiments, the relatively low levels of powder that can be used to provide adequate water reduce attenuation in the optical assemblies. For example, in conventional cables, excessive water-blocking powder may gather and agglomerate when moistened. The agglomerated powder can reach a size such that it presses against one or more optical fibers and induces delta attenuation.

One factor that can affect optical performance is the maximum particle size, average particle and/or particle size distribution of water-swellable powder, which can impact microbending if the optical fibers should contact (i.e., press against) the water-swellable particles. The average particle size for the water-swellable powder is preferably about 150 micron or less, but other suitable average particles sizes are possible such as 60 micron or less. The skilled artisan understands that since the powder is sieved using an appropriated sized mesh it has a distribution of particle sizes. For instance, individual particles may have an aspect ratio (i.e., longer than wide) that still fit through the sieving mesh in one direction and are larger than the average particle size. Using SAPs with a somewhat larger average maximum particle size may still provide acceptable performance, but using a larger maximum particle size increases the likelihood of experiencing increased levels of optical attenuation. One exemplary water-swellable powder is a crosslinked sodium polyacrylate available from Evonik, Inc. of Greensboro, N.C. under the tradename Cabloc GR-211. The particle distribution for this powder is given by Table 1:

TABLE 1

Particle Distribution for an Explanatory Water-Swellable Powder

| Particle Size | Approximate Percentage |
| --- | --- |
| Greater than 63 microns | 0.2% |
| 45 microns-63 microns | 25.7% |
| 25 microns-44 microns | 28.2% |

Of course, particulate matter including other powders, powder blends, and/or other particle distributions is possible. Another suitable crosslinked sodium polyacrylate is available from Absorbent Technologies, Inc. under the tradename Aquakeep J550P, still other types of water-swellable materials are also possible. By way of example, another suitable water-swellable powder is a copolymer of acrylate and polyacrylamide, which is effective with saline solutions. Furthermore, powder blends of two or more materials and/or water-swellable powders are possible such as blend of a slow-swelling water swellable powder and a fast-swelling water swellable powder. Likewise, a blend of water-swellable powder can include a first water-swellable powder that is highly-effective for a saline solution and a second water-swellable powder effective for tap water. Powder blends may also include components that are not inherently water-swellable. By way of example, small amounts of silica, such as, for example, a fumed silica, up to 3% may be added to a water-swellable powder for improving flow properties and/or inhibiting anti-caking due to moisture absorption. Additionally, concepts of the invention allow the use of other types of particles with or without the water-swellable particles such as flame-retardant particles (e.g., aluminum trihydrate, magnesium hydroxide, etc.), a dry lubricant like talc, graphite, boron, and/or the like.

A further factor to consider when selecting a water-swellable material is its absorption capacity. Absorption capacity is the amount of water that a unit of water-swellable material can absorb and is typically measured in grams of water absorbed per gram of water-swellable material. In one embodiment, the water-swellable material used in the methods described herein preferably has an absorption capacity of at least about 100 grams per grams of water-swellable material, but other values lower or higher are possible. For instance, the water-swellable material can have an absorption capacity of about 200 grams or more per gram of material, 300 grams or more per gram of material, or 400 grams or more per gram of material.

According to another aspect of the invention, the powder or powder blends used in the processes described herein can inhibit the sticking between the optical fibers and the tube without using a separation layer or other material. Specifically, fiber optic assemblies can have issues with the optical fibers contacting and sticking to the tube while it is molten state when being extruded about the optical fibers. If the optical fiber sticks to the inside of the tube it can cause the path of the optical fibers to be distorted (i.e., the optical fiber is prevented from moving at that point), which may induce undesirable levels of optical attenuation. As depicted in FIGS. 9 and 10, tube 805 is disposed about optical fibers 822 of fiber optic assembly 800 without using a further material or component as a separation layer (e.g., no gel, grease, yarn, tape, etc.) for inhibiting contact between the optical fibers and the molten tube. Sticking is inhibited because the water-swellable powder is a cross-linked material so it does not promote sticking thereto at typical extrusion temperatures. Thus, water-swellable powder 804 tends to act as a separation layer since it inhibits optical fibers 822 from sticking to the molten tube during manufacture.

The water-swellable powder 804 also acts to reduce the friction between the optical fibers and the tube or cavity wall by acting as a slip layer. The particulate matters effectively acts as ball-bearings between the optical fibers 822 and the inner wall of the tube to reduce friction and to reduce tension in the optical fibers. The optical fibers 822 may also include an outer layer such as an ink having a suitable lubricant for inhibiting optical fibers 822 from sticking to the molten tube 805 during extrusion. The tube 805 may include one or more suitable fillers in the polymer, thereby inhibiting the adherence of the optical fibers with the tube. Additionally, the use of other polymer materials for the tube such as a highly-filled PVC can inhibit sticking of the optical fibers to the tube.

The extruded tubes discussed in this specification may be constructed using any suitable polymer material for housing and protecting the optical fibers 822 therein. For example, the tube 805 and the tubes discussed in the extrusion methods can be a polypropylene (PP), polyethylene (PE), or blends of materials such as a blend of PE and ethylene vinyl acetate (EVA). In other embodiments, the tube 805 is formed from a flame-retardant material such as flame-retardant polyethylene, flame-retardant polypropylene, polyvinyl chloride (PVC), or polyvinylidene fluoride PVDF, thereby forming a portion of a flame retardant fiber optic cable. However, the tube 805 need not necessarily be formed from a flame-retardant material for making a flame-retardant fiber optic cable. In still other embodiments, the tube 805 may comprise a thin sheath that is easily tearable by the craft without tools. For example, a tube formed from a highly filled material renders it easily tearable by the craftsman merely using their fingers to tear the same. By way of example, tubes that are easily tearable may include a filled materials such as polybutylene terephthalate (PBT), a polycarbonate and/or a polyethylene (PE) material and/or an ethylene vinyl acrylate (EVA) or other blends thereof having fillers like a chalk, talc, or the like; however, other suitable materials are possible such as a UV-curable acrylates. Generally speaking, all other things being equal, the tube 805 can have a smaller inner diameter ID compared with dry tube assemblies that include a water-swellable yarn, tape, or thread (i.e., a carrier for the SAP) with the optical fibers. This is because the tube 805 does not have to provide the space for both the optical fibers and the carrier of the SAP (i.e., the yarn(s) or tapes); consequently the inner diameter of the tube may be smaller. A smaller inner diameter also allows for a smaller outer diameter, a more flexible assembly having a smaller bend radius (which may reduce kinking), lighter weight per length, and longer lengths of cable on a reel.

Figure 14:
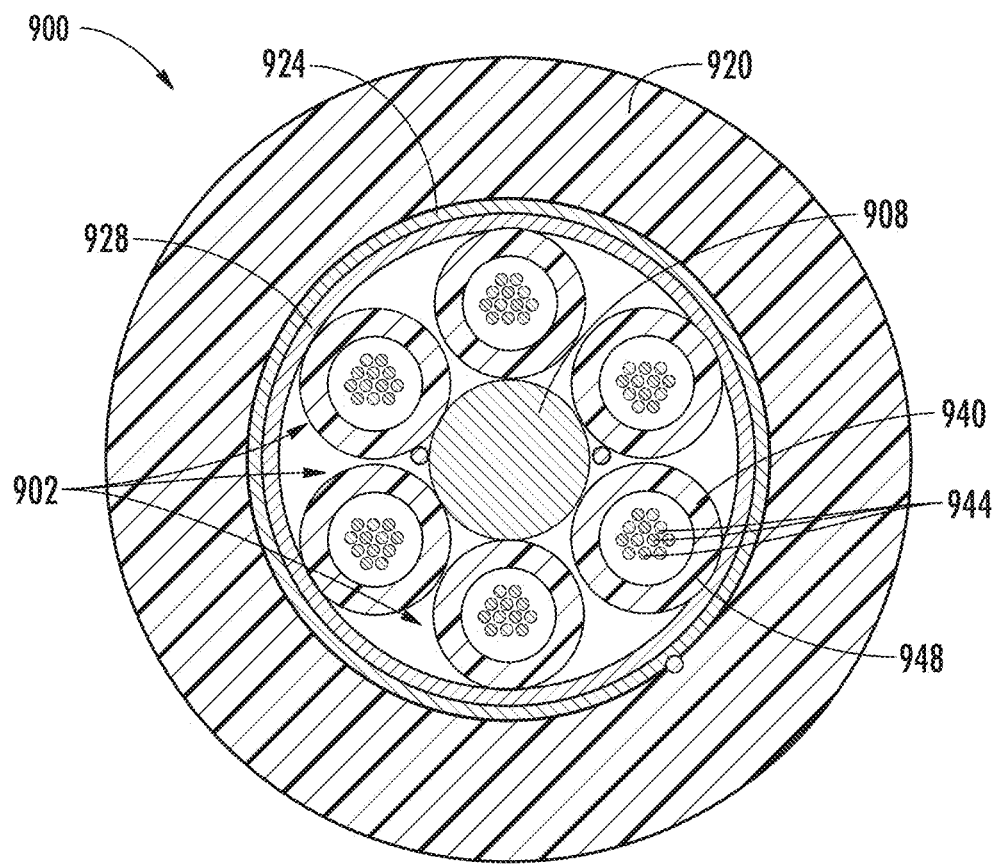
FIG. 14 is a cross-sectional view of another fiber optic cable manufactured according to the present invention.
Figure 15:
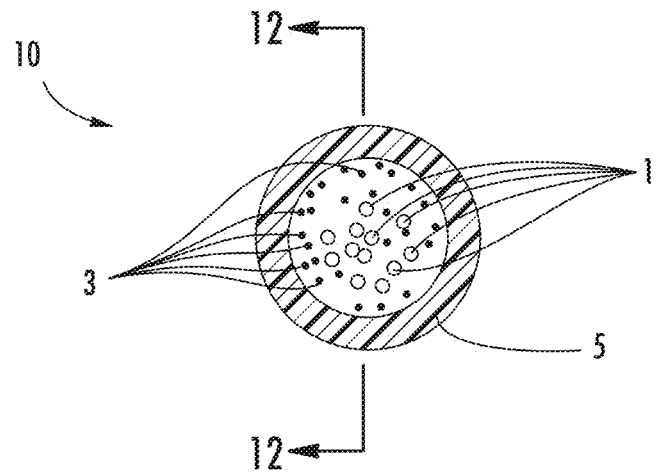
FIG. 15 is a cross-sectional view of a conventional fiber optic assembly using a relatively large quantity of water-swellable powder loosely disposed therein for blocking the migration of water.
Figure 16:
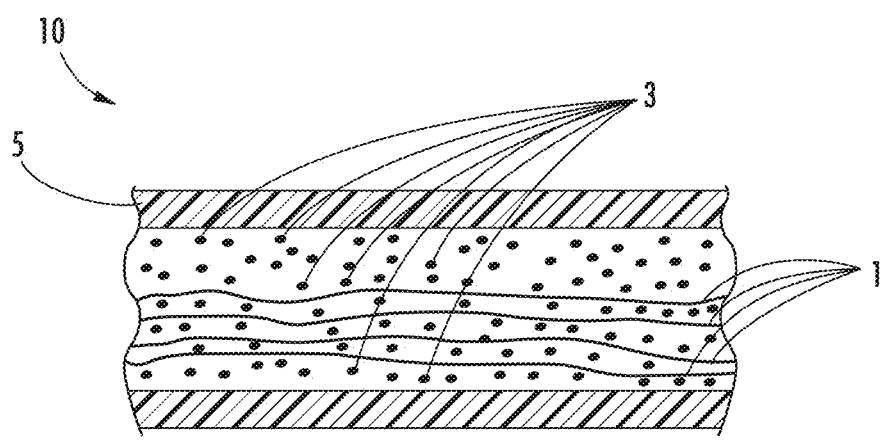
FIG. 16 is a longitudinal cross-sectional view of the conventional fiber optic assembly of FIG. 15.

FIG. 14 is a cross-sectional view of a fiber optic cable 900 manufactured according to the present invention. The cable comprises a plurality of subunits 902 arranged around a central strength member 908 and enclosed within a jacket 920. A fire-retardant layer 924 is arranged on the interior of the jacket 920, and a water-swellable layer 928 is arranged on the interior of the layer 924. Each subunit 902 has a tube 940 enclosing plurality of optical fibers 944. The tubes 940 can be extruded using the methods described herein, such that water-swellable particles are embedded in the interior tube surfaces 948. The subunits 902 can have relatively low levels of water-swellable powder with normalized concentrations of less than 0.01, for example.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

What is claimed is:

1. A method of making a fiber optic cable, comprising steps of:

providing at least one optical fiber in a process direction;

extruding an extrusion cone of polymer material that draws down surrounding the at least one optical fiber to form a tube;

accelerating powder particles in a motive gas through a nozzle, along the process direction, to an interior of the extrusion cone where the powder particles have sufficient momentum to collide with the interior of the extrusion cone, wherein the acceleration is such that at least a portion of the powder particles becomes mechanically attached to the extrusion cone with at least a part of an attached particles extending into or partially embedded within the tube; and including the tube with other tubes to form the fiber optic cable.

2. The method of claim 1, wherein the powder particles are accelerated to a speed corresponding to dilute phase conveyance by the nozzle.

3. The method of claim 1, wherein the attachment of the powder particles is such that less than all of the surface area within the tube is covered by the powder particles.

4. The method of claim 1, wherein the motive gas has a dew point of 0° C. or less.

5. The method of claim 1, further comprising a step of returning powder particles and motive gas, not consumed by the tube, through a passage counter to the process direction.

6. The method of claim 1, wherein the powder particles comprise super-absorbent polymer, wherein the powder particles have an average particle size of about 60 micrometers or less, and wherein the absorption capacity of the powder particles is at least 100 grams per gram of the powder particles.

7. The method of claim 1, wherein the powder particles comprise flame retardant particles.

8. The method of claim 1, wherein the mixture of motive gas and powder particles exits the nozzle at a velocity of at least 5 m/s.

9. The method of claim 8, wherein the mixture of motive gas and powder particles exits the nozzle at a distance of less than 5 mm from a nearest portion of the interior surface of the tube.

10. The method of claim 1, wherein a normalized concentration of powder particles in each tube is less than 0.005 grams per meter per square millimeter of tube inner cross-sectional area.

11. The method of claim 1, wherein the extrusion cone shrinks radially to form the tube after the powder particles become mechanically attached to the extrusion cone.

* * * * *

UNITED STATES PATENT AND TRADEMARK OFFICE
CERTIFICATE OF CORRECTION

PATENT NO. : 10,514,521 B2
APPLICATION NO. : 15/210155
DATED : December 24, 2019
INVENTOR(S) : Rodney Maurice Burns et al.

Page 1 of 1

It is certified that error appears in the above-identified patent and that said Letters Patent is hereby corrected as shown below:

On the Title Page

On page 3, Column 1, item [56], other publications, Line 9, delete "EP1157672." and insert -- EP11157672. --, therefor.

Signed and Sealed this
Third Day of March, 2020

Andrei Iancu
*Director of the United States Patent and Trademark Office*